US012732844B2

(12) United States Patent
de la Oliva et al.

(10) Patent No.: US 12,732,844 B2
(45) Date of Patent: Sep. 8, 2026

(54) METHODS AND PROCEDURES FOR PROVIDING AN IEEE 802.11 BASED RADIO NETWORK INFORMATION SERVICE FOR ETSI MEC

(71) Applicant: INTERDIGITAL PATENT HOLDINGS, INC., Wilmington, DE (US)

(72) Inventors: Antonio de la Oliva, Madrid (ES); Robert G. Gazda, Spring City, PA (US); Alain Mourad, Staines-Upon-Thames (GB)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 288 days.

(21) Appl. No.: 16/961,070

(22) PCT Filed: Jan. 11, 2019

(86) PCT No.: PCT/US2019/013234

§ 371 (c)(1),
(2) Date: Jul. 9, 2020

(87) PCT Pub. No.: WO2019/140221

PCT Pub. Date: Jul. 18, 2019

(65) Prior Publication Data

US 2021/0211914 A1 Jul. 8, 2021

Related U.S. Application Data

(60) Provisional application No. 62/616,984, filed on Jan. 12, 2018.

(51) Int. Cl.
*H04W 24/10* (2009.01)
*H04W 84/12* (2009.01)

(52) U.S. Cl.
CPC ............ *H04W 24/10* (2013.01); *H04W 84/12* (2013.01)

(58) Field of Classification Search
CPC .............................. H04W 24/10; H04W 84/13
See application file for complete search history.

(56) References Cited

U.S. PATENT DOCUMENTS

| | | | |
|---|---|---|---|
| 9,351,282 | B2 | 5/2016 | Freda et al. |
| 9,693,366 | B2 | 6/2017 | Adjakple et al. |

(Continued)

FOREIGN PATENT DOCUMENTS

| | | | |
|---|---|---|---|
| CN | 102076060 | A | 5/2011 |
| KR | 20150067033 | A | 6/2015 |

(Continued)

OTHER PUBLICATIONS

Part 11: Wireless LAN Medium Access Control (MAC) and Physical Layer (PHY) Specifications (Year: 2016).*

(Continued)

*Primary Examiner* — Michael Thier
(74) *Attorney, Agent, or Firm* — Volpe Koenig

(57) ABSTRACT

A request for multi-domain network information may be transmitted, by a STA, to an ME app. In response to the request, multi-domain network information corresponding to a plurality of WLANs may be received, by the STA. The response to the request may be received from a MEC service, of the ME app which runs on an MEP. In an embodiment, the ME app may be configured to obtain the multi-domain network information from an RNIS. In an embodiment, the STA may be associated with an AP controlled by a WiFi controller which is configured to collect measurement information of the plurality of WLANs and provide the measurement information to the MEP. Any one or more of the MEP, ME app or ME service may be (Continued)

configured to order the request and response with other requests and responses of one or more other STAs or ME apps.

9 Claims, 12 Drawing Sheets

(56) References Cited

U.S. PATENT DOCUMENTS

| | | | | |
|---|---|---|---|---|
| 10,110,495 | B1 | 10/2018 | Sabella et al. | |
| 2006/0270399 | A1* | 11/2006 | Qi | H04L 43/0852 455/423 |
| 2007/0002757 | A1 | 1/2007 | Soomro et al. | |
| 2015/0163769 | A1 | 6/2015 | Lee et al. | |
| 2016/0021593 | A1 | 1/2016 | Chou et al. | |
| 2016/0127424 | A1 | 5/2016 | Lee et al. | |
| 2018/0049179 | A1* | 2/2018 | Shah | H04W 72/51 |
| 2018/0183855 | A1* | 6/2018 | Sabella | H04W 52/0264 |
| 2018/0242191 | A1* | 8/2018 | Lundqvist | H04W 28/0268 |
| 2019/0042318 | A1* | 2/2019 | Ljung | G06F 9/5072 |
| 2019/0245789 | A1* | 8/2019 | Sabella | H04L 47/824 |
| 2020/0068340 | A1* | 2/2020 | Rasanen | H04W 60/04 |
| 2020/0186989 | A1* | 6/2020 | Isberg | H04W 64/006 |
| 2020/0229037 | A1* | 7/2020 | Agarwal | H04W 36/0033 |
| 2021/0176613 | A1* | 6/2021 | Purkayastha | H04W 4/02 |

FOREIGN PATENT DOCUMENTS

| | | |
|---|---|---|
| WO | 2017/121478 | 7/2017 |
| WO | 2017/220158 | 12/2017 |
| WO | 2018/103858 | 6/2018 |

OTHER PUBLICATIONS

IEEE 802.11 WLAN MAC and PHY Part 11 (Dec. 2016) (Year: 2016).*

MEC(17)000641 (Year: 2017).*

Nokia Germany, "Draft—RGS/MEC-0012v211RnisApi (GS MEC 012)," ETSI MEC(17)000584 (Nov. 10, 2017).

Nokia Networks, "MEC028-SD AP Location," ETSI MEC(17)000643r1 (Dec. 4, 2017).

Nokia Networks, "MEC028-SD AP Neighbor Report," ETSI MEC(17)000644r1 (Dec. 4, 2017).

Nokia Networks, "MEC028-SD BSS Load," ETSI MEC(17)000641r1 (Dec. 4, 2017).

Nokia Networks, "MEC028-SD Est WLAN tp," ETSI MEC(17)000646r1 (Dec. 4, 2017).

Nokia Networks, "MEC028-SD STA Ftm," ETSI MEC(17)000648r1 (Dec. 4, 2017).

Nokia Networks, "MEC028-SD STA RSSI," ETSI MEC(17)000645r1 (Dec. 4, 2017).

Nokia Networks, "MEC028-SD STA statistics Report," ETSI MEC(17)00647r1 (Dec. 4, 2017).

European Telecommunication Standards Institute, "Mobile Edge Computing (MEC); Framework and Reference Architecture," ETSI GS MEC 003 V1.1.1 (Mar. 2016).

European Telecommunication Standards Institute, "Mobile Edge Computing (MEC); Radio Network Information API," ETSI GS MEC 012 V1.1.1 (Jul. 2017).

European Telecommunication Standards Institute, "Multi-access Edge Computing (MEC); Phase 2: Use Cases and Requirements," ETSI GS MEC 002 V2.1.1 (Oct. 2018).

European Telecommunication Standards Institute, "Multi-access Edge Computing (MEC); Technical Requirements," ETSI GS MEC 002 V1.4.3 (Jan. 2018).

European Telecommunication Standards Institute, "Multi-access Edge Computing (MEC); WLAN Information API," ETSI GS MEC 028 V1.2.0 (Oct. 2017).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Kanugovi et al., "Multiple Access Management Services," Intarea, Internet—draft (Dec. 29, 2017).

Li, "Edge computing-based access network selection for heterogeneous wireless networks," Networking and Internet Architecture, Université de Rennes (2017).

Liu et al., "Performance Evaluation of Integrated Multi-Access Edge Computing and Fiber-Wireless Access Networks," IEEE Access, vol. 6 (May 7, 2018).

Patel et al., "Mobile-Edge Computing," Introductory Technical White Paper, pp. 1-36 (Sep. 2014).

Rimal et al., "Mobile Edge Computing Empowered Fiber-Wireless Access Networks in the 5G Era," IEEE Communications Magazine, pp. 192-200 (Feb. 2017).

Third Generation Partnership Project, "Technical Specification Group Radio Access Network; Evolved Universal Terrestrial Radio Access Network (E-UTRAN); S1 Application Protocol (S1AP) (Release 14)," 3GPP TS 36.413 V14.4.0 (Sep. 2017).

Third Generation Partnership Project, "Technical Specification Group Radio Access Network; Evolved Universal Terrestrial Radio Access Network (E-UTRAN); S1 Application Protocol (S1AP) (Release 14)," 3GPP TS 36.413 V14.8.0 (Dec. 2018).

Third Generation Partnership Project, "Technical Specification Group Radio Access Network; Evolved Universal Terrestrial Radio Access Network (E-UTRAN); S1 Application Protocol (S1AP) (Release 15)," 3GPP TS 36.413 V15.4.0 (Dec. 2018).

Viavisolutions Deutsch. Gmbh, "MEC012 Reintroduce subscription Type add notification Type," MEC(17) 000659 (Dec. 4, 2017).

ZTE, "MEC-0028-Stage 2 information flows for clause 5," MEC(xx)000667r3 (Jan. 9, 2018).

Nokia Networks, MEC028-SD STA statistics Report, MEC(17)000647 (Dec. 4, 2017).

Nokia Networks, MEC028-SD BSS Load, MEC(17)000641 (Dec. 4, 2017).

Nokia Networks, MEC028-SD STA Ftm, MEC(17)000648 (Dec. 4, 2017).

* cited by examiner 100
108 PSTN
112 Other Networks
106 Core Network
110 Internet
104 RAN
114a
114b
116
102a
102b
102c
102d

METHODS AND PROCEDURES FOR PROVIDING AN IEEE 802.11 BASED RADIO NETWORK INFORMATION SERVICE FOR ETSI MEC

CROSS REFERENCE TO RELATED APPLICATIONS

This application is the U.S. National Stage, under 35 U.S.C. § 371, of International Application No. PCT/US2019/013234 filed Jan. 11, 2019, which claims the benefit of U.S. provisional application No. 62/616,984 filed on Jan. 12, 2018, which is incorporated by reference as if fully set forth.

SUMMARY

A method performed by a service consumer may comprise transmitting, by the service consumer to a wireless local area network (WLAN) information service, measurement configuration information. The method may further comprise transmitting, by the service consumer to the WLAN information service, a request for access point (AP) information (APinfo). In response to the request, the service consumer may receive from the WLAN information service, the APinfo comprising a time stamp and an information element indicating a channel load.

BRIEF DESCRIPTION OF THE DRAWINGS

Furthermore, like reference numerals in the figures indicate like elements, and wherein.

EXAMPLE NETWORKS FOR IMPLEMENTATION OF THE EMBODIMENTS

Figure 1A:
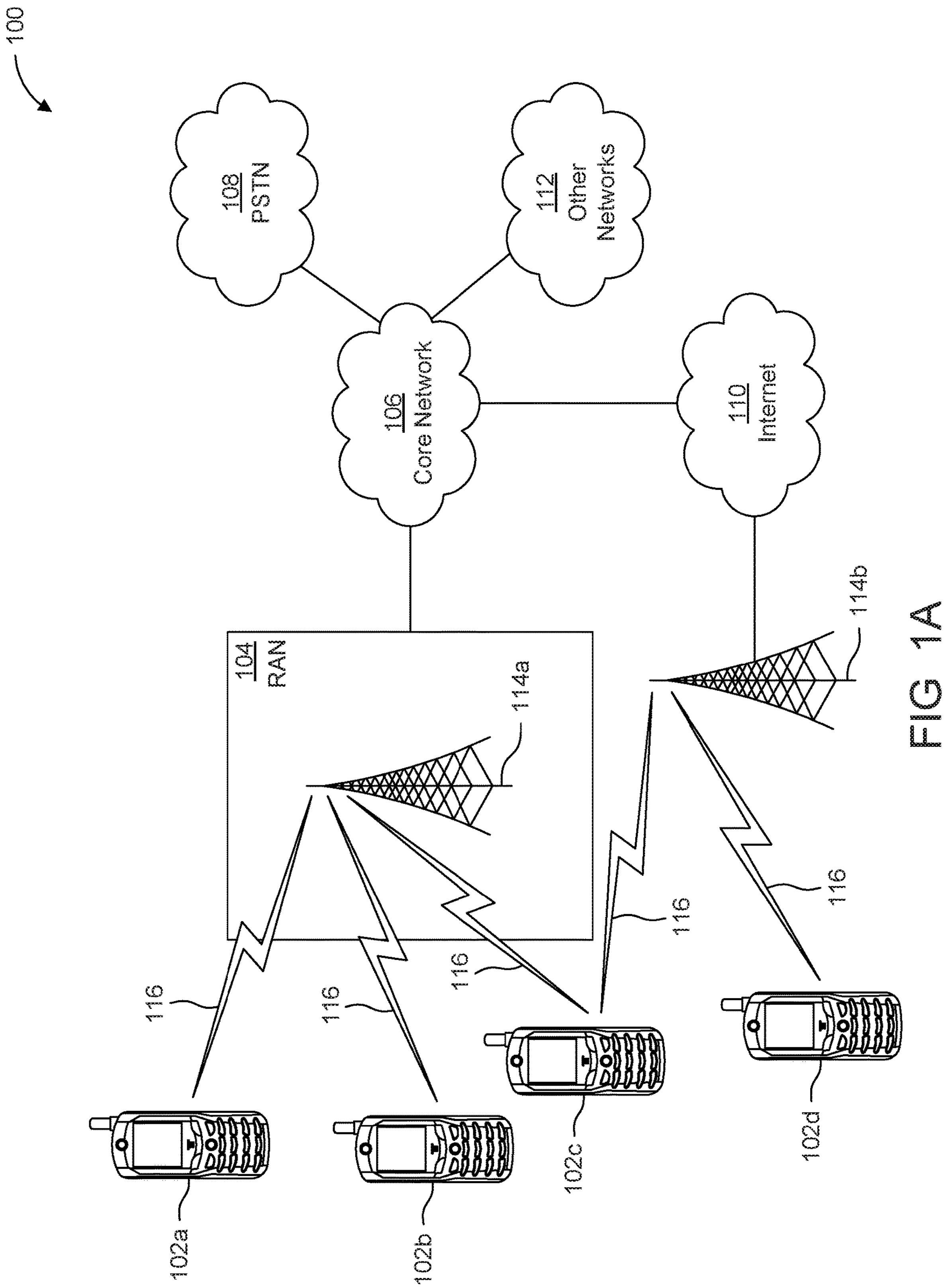
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
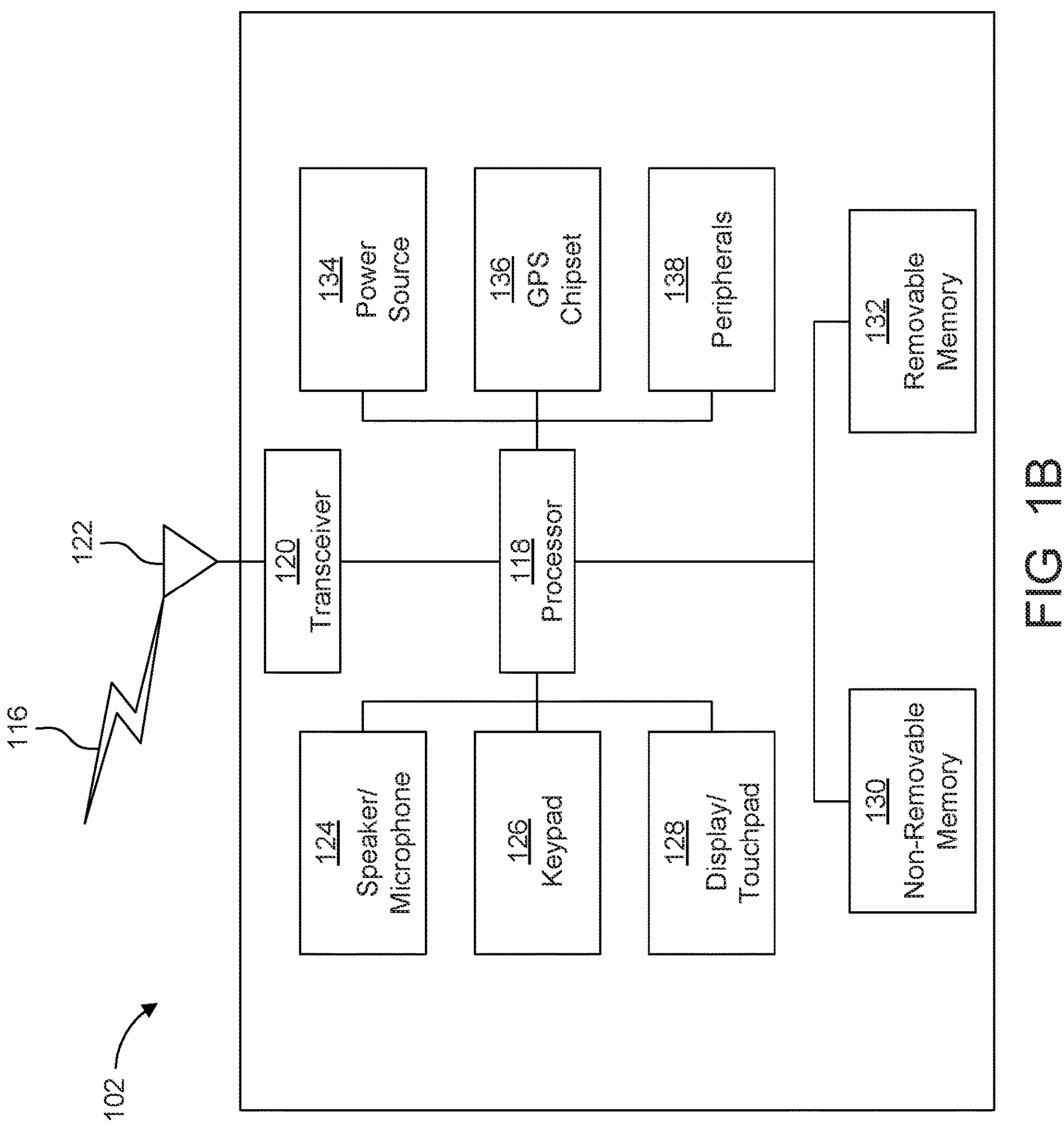
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception).

Figure 1C:
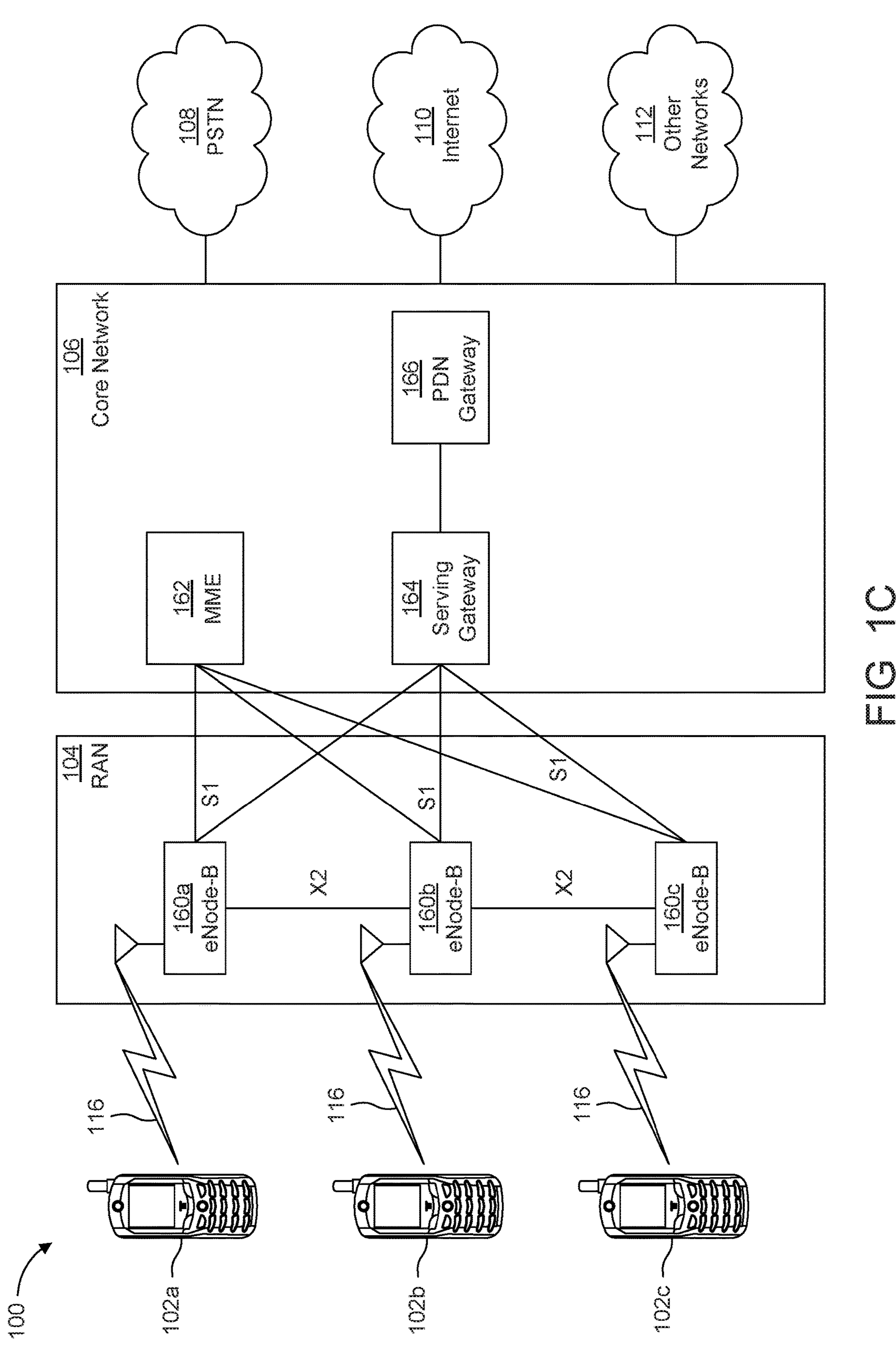
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
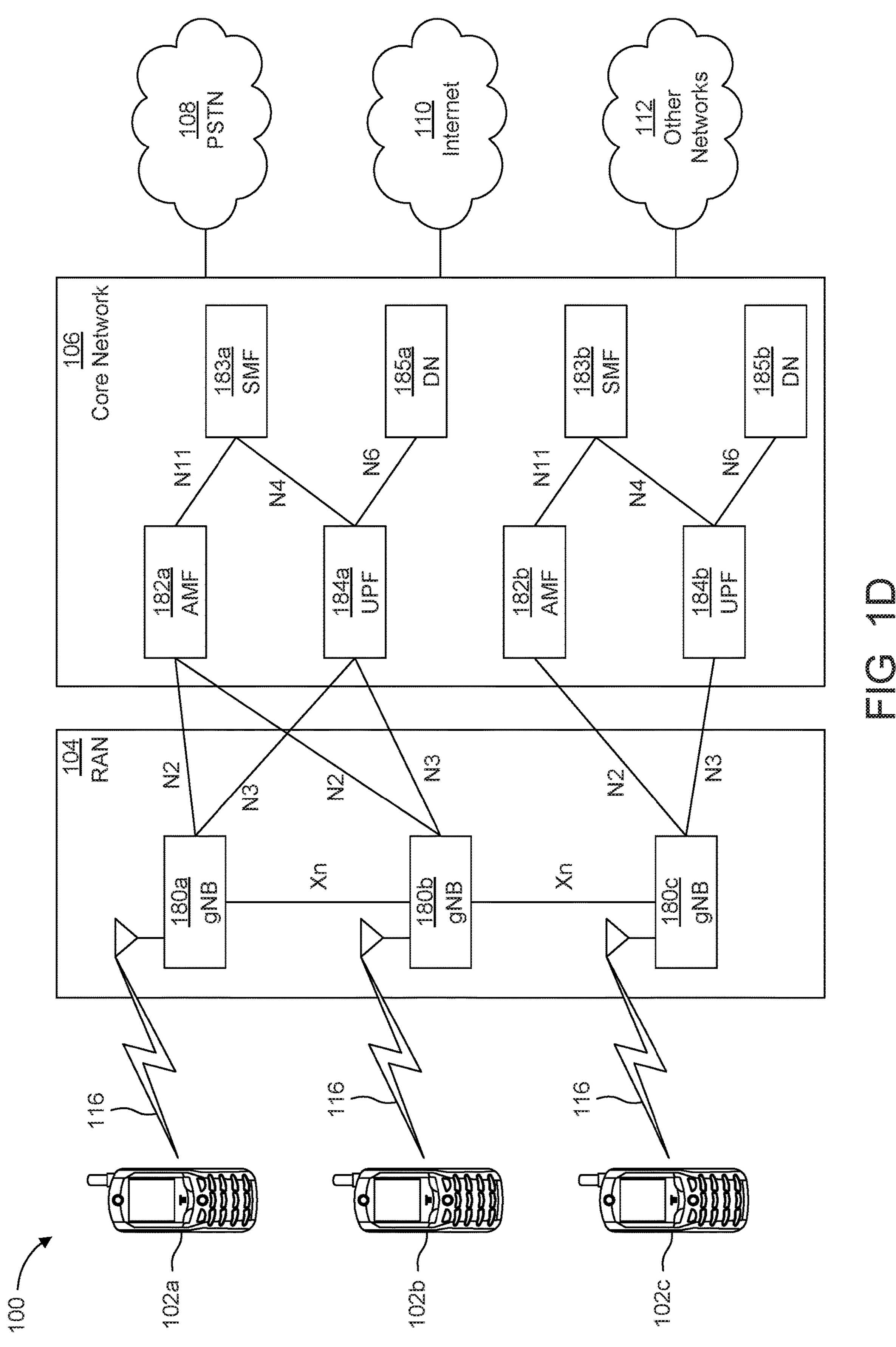
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102_a_, 102_b_, 102_c_, support for network slicing (e.g., handling of different protocol data unit (PDU) sessions with different requirements), selecting a particular SMF 183_a_, 183_b_, management of the registration area, termination of non-access stratum (NAS) signaling, mobility management, and the like. Network slicing may be used by the AMF 182_a_, 182_b_ in order to customize CN support for WTRUs 102_a_, 102_b_, 102_c_ based on the types of services being utilized WTRUs 102_a_, 102_b_, 102_c_. For example, different network slices may be established for different use cases such as services relying on ultra-reliable low latency (URLLC) access, services relying on enhanced massive mobile broadband (eMBB) access, services for MTC access, and the like. The AMF 182_a_, 182_b_ may provide a control plane function for switching between the RAN 104 and other RANs (not shown) that employ other radio technologies, such as LTE, LTE-A, LTE-A Pro, and/or non-3GPP access technologies such as WiFi.

The SMF 183_a_, 183_b_ may be connected to an AMF 182_a_, 182_b_ in the CN 106 via an N11 interface. The SMF 183_a_, 183_b_ may also be connected to a UPF 184_a_, 184_b_ in the CN 106 via an N4 interface. The SMF 183_a_, 183_b_ may select and control the UPF 184_a_, 184_b_ and configure the routing of traffic through the UPF 184_a_, 184_b_. The SMF 183_a_, 183_b_ may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184_a_, 184_b_ may be connected to one or more of the gNBs 180_a_, 180_b_, 180_c_ in the RAN 104 via an N3 interface, which may provide the WTRUs 102_a_, 102_b_, 102_c_ with access to packet-switched networks, such as the Internet 110, to facilitate communications between the WTRUs 102_a_, 102_b_, 102_c_ and IP-enabled devices. The UPF 184, 184_b_ may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102_a_, 102_b_, 102_c_ with access to the other networks 112, which may include other wired and/or wireless networks that are owned and/or operated by other service providers. In one embodiment, the WTRUs 102_a_, 102_b_, 102_c_ may be connected to a local DN 185_a_, 185_b_ through the UPF 184_a_, 184_b_ via the N3 interface to the UPF 184_a_, 184_b_ and an N6 interface between the UPF 184_a_, 184_b_ and the DN 185_a_, 185_b_.

In view of FIGS. 1A-1D, and the corresponding description of FIGS. 1A-1D, one or more, or all, of the functions described herein with regard to one or more of: WTRU 102_a-d_, Base Station 114_a-b_, eNode-B 160_a-c_, MME 162, SGW 164, PGW 166, gNB 180_a-c_, AMF 182_a-b_, UPF 184_a-b_, SMF 183_a-b_, DN 185_a-b_, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Edge computing and fog computing are emerging technologies which enable service and content providers to offer applications on the edge of the network, rather than utilizing the core network or distant cloud data centers. In other works, edge computing extends "traditional" cloud services (such as Microsoft Azure or Amazon Elastic Cloud) towards the network edge, where applications and services may receive the benefits of low-latency, proximity and context awareness, by either moving backend functionality closer to the client device, for example, a smartphone, IoT device, intelligent vehicle, or the like, or by offloading functions from the device into the edge.

Edge computing may be a necessary point of presence for 5G services that require low-latency, such as those defined within the Ultra-Reliable and Low Latency Communications (URLLC) quadrant of the IMT-2020 5G service model. These include autonomous vehicles (cars, drones, etc.), industry automation and smart factories, robotics, and tactile internet. Edge Computing also provides benefits to Enhanced Mobile Broadband (eMBB) and Massive Machine Type Communications (mMTC) by allowing processing to be placed at different points through the network, enabling service and network flexibility and optimizing network resources.

The Multi-Access Edge Computing (MEC) Industry Specification Group (ISG) within European Telecommunications Standards Institute (ETSI) is a leading standards initiative within the edge computing area. The MEC ISG is chartered to create a standardized, open environment that enables the efficient and seamless integration of edge applications from vendors, service providers, and third parties across mobile-edge computing platforms within a multi-vendor, multi-domain, mobile-edge computing environment.

A unique characteristic of MEC compared to other edge computing standards and consortiums, such as Open Fog Computing, is the goal of providing access to real-time information on radio network conditions to tailor application behavior and services. During Phase 1 of the MEC ISG (2015-2016), the MEC ISG focused integration with 3GPP LTE cellular networks. However, in Phase 2 (2017-2018), the MEC ISG has expanded scope to include other access technologies, including 802.11 WLAN.

Figure 2:
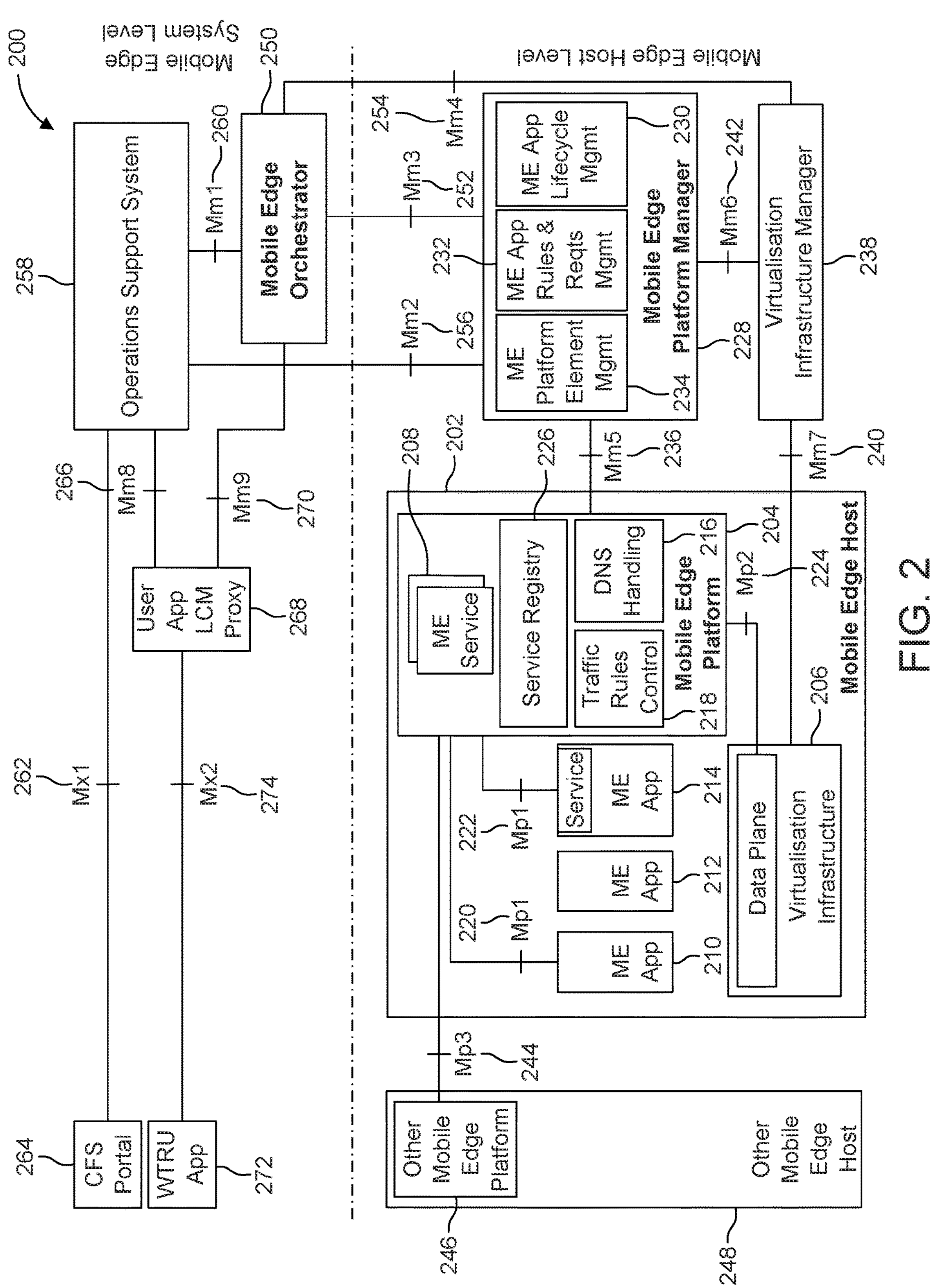
FIG. 2 is a block diagram of an example European Telecommunications Standards Institute (ETSI) Multi-Access Edge Computing (MEC) architecture.

FIG. 2 illustrates an example ETSI MEC Architecture 200. As shown in FIG. 2, a mobile edge host (MEH) 202 is an entity that contains a mobile edge platform (MEP) 204 and a virtualization infrastructure 206. An MEP 204 may include a collection of essential functionality to run mobile edge applications on a virtualization infrastructure. Mobile edge applications (ME apps) 210, 212, 214 may be instantiated on the virtualization infrastructure 206 of the MEH 202 based on a configuration or based on requests validated by mobile edge management. MEP 204 may include one or more ME services 208, a service registry 226 and may provide for traffic rules control 218 and DNS handling 216. ME apps 210, 212, 214 may be configured to communicate with the MEP 204 via an Mp1 reference point 220, 222. Reference point Mp2 224 may provide an interface between MEP 204 and virtualization infrastructure 206. In one embodiment, reference points may be used to connect one or more functional elements.

A mobile edge platform manager (MEPM) 228 may manage an application life cycle 230 and may provide element management functions 234 to an MEP. The MEPM 228 may also manage application rules and requirements 232. Mobile Edge Services (ME services) 208 may be hosted on the MEP 204 and may offer a range of capabilities, including: communication services, traffic loading services and location services. ME services may also store or provide radio network information. ME services may be natively provided in the MEP or registered as add-on services by 3rd parties.

MEPM 228 may be in communication with MEP 204 via the Mm5 reference point 236. MEPM 228 may also communicate with a virtualization infrastructure manger 238 via the Mm6 reference point 242. Virtualization infrastructure manager 238 may be in communication with virtualization infrastructure via the Mm7 reference point 240. An Mp3 reference point 244 connects other mobile edge platforms 246 of other mobile edge hosts 248 to the MEP.

A mobile edge orchestrator 250 may communicate with MEPM 228 via Mm3 252 and with virtualization infrastructure manager 238 via Mm4 reference point 254. Reference point Mm2 256 may be used to connect an operations support system 258 to the MEPM 228. Operations support system 258 may interface with the mobile edge orchestrator 250 via reference point Mm1 260. Reference point Mx1 262 may connect the operations support system 258 to a customer facing service (CFS) portal 264. Reference point Mm8 266 may connect the operations support system 258 to a user application lifecycle management (LCM) proxy 268 which is coupled to the mobile edge orchestrator 250 via Mm9 270. The user application LCM proxy 268 may interface with UE applications 272 via Mx2 274.

MEC offers real-time network information to authorized mobile-edge applications via the MEC defined Radio Network Information service (RNIS). The current MEC RNIS is defined for 3GPP LTE access networks only and may need to be updated to include IEEE based or other network based functionality. The RNIS provides a representational state transfer (REST) application program interface (API) that includes or responds to a query or direct access service and notification subscription service. A direct request of information, for example, a query may be one or more of a: PlmnInfo; RabInfo; or S1BearerInfo query. A subscription based service, for example a subscribe/notify service may include a: CellChangeSubscription/Notification; RabEstSubscription/Notification; RabModSubscription/Notification; RabRelSubscription/Notification; MeasRepUeSubscription/Notification; MeasTaSubscription/Notification; CaReconfSubscription/Notification; S1BearerSubscription/Notification; and/or SubscriptionLinkList/ExpiryNotification.

All of the above information may be specific to 3GPP LTE. Radio network information for other (non-3GPP) radio access technologies was not considered within ETSI MEC Phase 1 and was left to future consideration.

In Phase 2, circa 2017-2018, the ETSI MEC industry specification group (ISG) expanded the scope to include multi-access edge deployments, including non-3GPP radio networks. Thus, WLAN, including IEEE 802.11, is a radio access technology that MEC may support. The definition of a WLAN RNIS service is commencing with a framework API specification. The framework specification does not include any details with respect to WLAN network information, API format, or the like.

IEEE 802.11-2016 includes several possibilities for performing measurements in the WLAN radio interface. WLAN radio measurements enable stations (STAs) to observe and gather data on radio link performance and on the radio environment. A STA may choose to make measurements locally, request a measurement from another STA or may be requested by another STA to make one or more measurements and return one or more of the results. Results may be returned via an API or may also be returned directly to the requesting STA. Radio measurement data is made available to STA management and upper protocol layers where it may be used for a range of applications. A radio measurement service may include measurements that extend the capability, reliability and maintainability of WLANs by providing standard measurements across vendors, and the service provides the resulting measurement data to upper layers in the communications stack.

It should be noted that all nodes in an IEEE 802.11 network are named station (STA), regardless if they are an access point or terminal device. If a STA is configured as an AP and requires one or more features or functionalities of an AP, hereinafter it may be described as a STA-AP or AP-STA.

Request and report measurements may be performed using beacons, probe responses, measurement pilots as well as using other elements. Using a beacon request/report pair enables a STA to request from another STA a list of APs whose beacons it may receive on a specified channel or channels. Then a measuring STA monitors the requested channel; measures beacon, probe response, and measurement pilot power levels, for example, a received channel power indicator (RCPI); and logs some or all beacons, probe responses, and measurement pilots received within the measurement duration. Using a frame request/report pair may provide or return a picture of all the channel traffic and a count of all the frames received at the measuring STA. For each unique transmitter address, the STA may report the transmitter address, number of frames received from this transmitter, RCPI for these frames, and basic service set identifier (BSSID) of the transmitter. Other information may be utilized, for example, any element of the frames exchanged.

A channel load request/report pair may provide or return a channel utilization measurement as observed by the measuring STA. A noise histogram request/report pair may provide or return a power histogram measurement of non-IEEE 802.11 noise power by sampling the channel when virtual carrier sense indicates idle and the STA is neither transmitting nor receiving a frame. A STA statistics request/ report pair may provide or return groups of values for STA counters and for BSS average access delay. The STA counter group values may include transmitted fragment counts, group addressed transmitted frame counts, failed counts, retry counts, multiple retry counts, frame duplicate counts, request to send (RTS) success counts, RTS failure counts, acknowledgement (ACK) failure counts, received fragment counts, group addressed received frame counts, frame check sequence (FCS) error counts and transmitted frame counts among others. BSS average access delay group values include AP average access delay, average access delay for each access category, average access delay for one or more frequencies of the AP, associated STA count, available admission capacity and channel utilization.

Location configuration information may be requested and returned. A location request/report pair may provide or return a requested location in terms of latitude, longitude, and altitude. Alternatively, a location may be specified using other geographical methods. A location may be specified more accurately, including specifying types of altitude, such as one or more floors of a building. A location may be permitted and specified using various reporting resolutions or granularities. A neighbor report request may be sent to an AP, which returns a neighbor report containing information about known neighbor APs that are candidates for a service set transition. A link measurement request/report exchange may provide measurements of the RF characteristics of a STA-to-STA link. This measurement may indicate the instantaneous quality or a longer term quality of a link. A transmit stream/category measurement is a request/report pair that may enable a QoS STA to inquire of a peer QoS STA, a condition of an ongoing traffic stream between the pair.

Additional measurements may be included and supported. For example, location services measurements may be included. Location configuration request and response frames may enable STAs to configure a collection of location related parameters for location track notification frames. Collocated interference reporting may enable the requesting STA to obtain information on interference due to collocated radios at the reporting STA. The requesting STA may use that information to schedule one or more transmissions to minimize the effects of the interference. A triggered STA statistics reporting capability may enable generation of a STA statistics report when the statistics of interest reach a predefined threshold.

Measurement taking and measurement formats may be defined by one or more IEEE 802.11 standard. The RNIS defined by ETSI MEC gathers and reports underlying radio network conditions to an ME app. By utilizing information on radio conditions, the ME app may optimize its behavior to the network, for example, the ME app may adjust video coding formats, update traffic steering rules or the like. Currently, ETSI MEC has defined RNIS for LTE technology only. With an expansion of the scope of MEC to include access networks other than LTE, a definition of an RNIS services towards ME applications for IEEE 802.11, WLAN access networks is needed.

In addition, LTE technology is significantly different from IEEE 802.11 networks, in relation to radio network metrics and measurements. The differences in range and deployment scenarios, for example, indoor vs. outdoor, macro vs. small cell, etc. affect the way measurements and radio metrics may be gathered from WLAN networks and how the results are presented or reported towards an entity, such as an MEC RNIS service. A requirement in the WLAN radio information context is the need for configuration of a measurement process in order to consider diversity which is present in a WLAN network. Indeed, the IEEE 802.11 standard includes a range of options to conduct measurements. However, the paradigm of configuring MEC service parameters, such as radio measurements and metrics for RNIS, is not considered within ETSI MEC. LTE radio measurements and metrics are not configurable from MEC, with any and all configuration of metrics taking place outside of MEC within the 3GPP network. As noted above, this static radio measurement paradigm may not work for WLAN.

It is expected that WLAN network providers accessible to or accessible by a WTRU may not all be of the same entity (vendor, operator, etc.) as the MEC edge service provider. In addition, due to the indoor nature of WLAN, a range of WLAN deployment scenarios are envisioned and even present in current WLAN networks. As such, a southbound interface from MEC, for example, an MEP or in general MEC system, towards the WLAN radio network may be required, which may depend on the actual deployment scenario. To date, southbound interfaces have been considered out of scope by ETSI MEC and deferred to 3GPP.

Embodiments for obtaining and delivering 802.11 WLAN radio metrics into the MEC system are provided herein. The WLAN radio metrics are utilized to deliver a WLAN RNIS towards ME apps, consistent with the ETSI MEC reference architecture. Southbound interface options are provided to interconnect MEC, via the MEC Platform, towards various WLAN radio network deployment scenarios, in order to obtain WLAN radio metrics to offer a WLAN RNIS toward ME apps. Options are mainly driven by the underlying WLAN network and its configuration.

WLAN radio metrics and measurements require a level of configuration to deal with the diverse nature of WLAN deployments. This configuration level is not present with 3GPP metrics. IEEE 802.11 has defined a rich measurement framework to both configure and manage WLAN metrics and measurements. Various embodiments, each having trade-offs, may be used for an MEC WLAN RNIS to configure the IEEE 802.11 metric environment.

In one embodiment, a configuration of WLAN measurement and metric parameters is performed by an ME App, for example, an MEC WLAN RNIS exposes an interface to allow ME apps to configure the WLAN RNIS service. The concept of MEC service consumers, which may include ME apps, configuring and adjusting MEC service parameters may be generalized from RNIS and applied to other services. Some example services may include video analytics, location services, Internet-of-Things (IoT) applications, augmented or virtual reality, optimized local content distribution and data caching.

In a second embodiment, a configuration of WLAN measurement and metric parameters is performed by the MEC system, for example by an MEPM, offloading the complexity of such configuration from ME apps.

It should be noted that a combination of these two options may also be utilized, in an embodiment where the MEPM sets default values for all parameters, and ME apps may update select parameters, if or as needed.

Since more than one ME app may be requesting service from the MEC WLAN RNIS on a single MEC platform or across a set of MEC platforms, a mechanism may be employed to handle conflicts where two ME apps request non-compatible measurements or a measurement overload condition occurs towards the WLAN network. An overload condition may occur when the WLAN network is overburdened with measurements and may not be able to sufficiently report or provide any meaningful data.

The ETSI MEC reference architecture defines a REST based API interface between ME apps and MEC services, for example, an RNIS. A protocol definition to provide a WLAN RNIS towards ME apps may be employed. In one embodiment, a WLAN RNIS may be presented to ME apps as a separate and independent service, for example, having a separate interface definition and service end-point, from the LTE RNIS and other RATs as they become supported. In another embodiment, a single RNIS service may be presented to ME apps that encapsulates radio network information for all RATs in a single interface and service end-point.

In IEEE 802.11 networks, terminals may not be able to gather a full view of the current wireless domain. A mechanism by which a terminal is able to obtain information, from the MEC, on the radio performance that might be achievable in a whole or at least a larger wireless domain or larger portion of the wireless domain than is currently possible is needed.

Virtual terminals running as applications in the MEC may require real input or feedback from the wireless channel to mimic current operation of the physical terminal. This information may be gathered from the IEEE 802.11 RNIS and it may be provided to a virtual terminal or virtual app.

With respect to the following embodiments, is it not precluded as to which STAs are the ones performing or taking measurements. The measuring STAs may be STA-APs or non-AP STAs, for example, terminal devices. There may be many deployment options for an MEC WLAN RNIS. The RNIS service, regardless of RAT, may require support by or from the underlying RAT in order to provide measurements and metrics. In the case of IEEE 802.11, radio measurements are defined in IEEE 802.11k and later included in IEEE 802.11-2016. Some of the measurements 802.11k supports include measurements for: roaming decisions; RF channel knowledge, hidden nodes; client statistics and transmit power control (TCP).

There are multiple embodiments for deploying an IEEE 802.11-based RNIS and interconnecting the MEC platform. Some embodiments may require 802.11 radio information to be exposed to edge applications and a WLAN network which provides the actual 802.11 radio information metrics.

Figure 3:
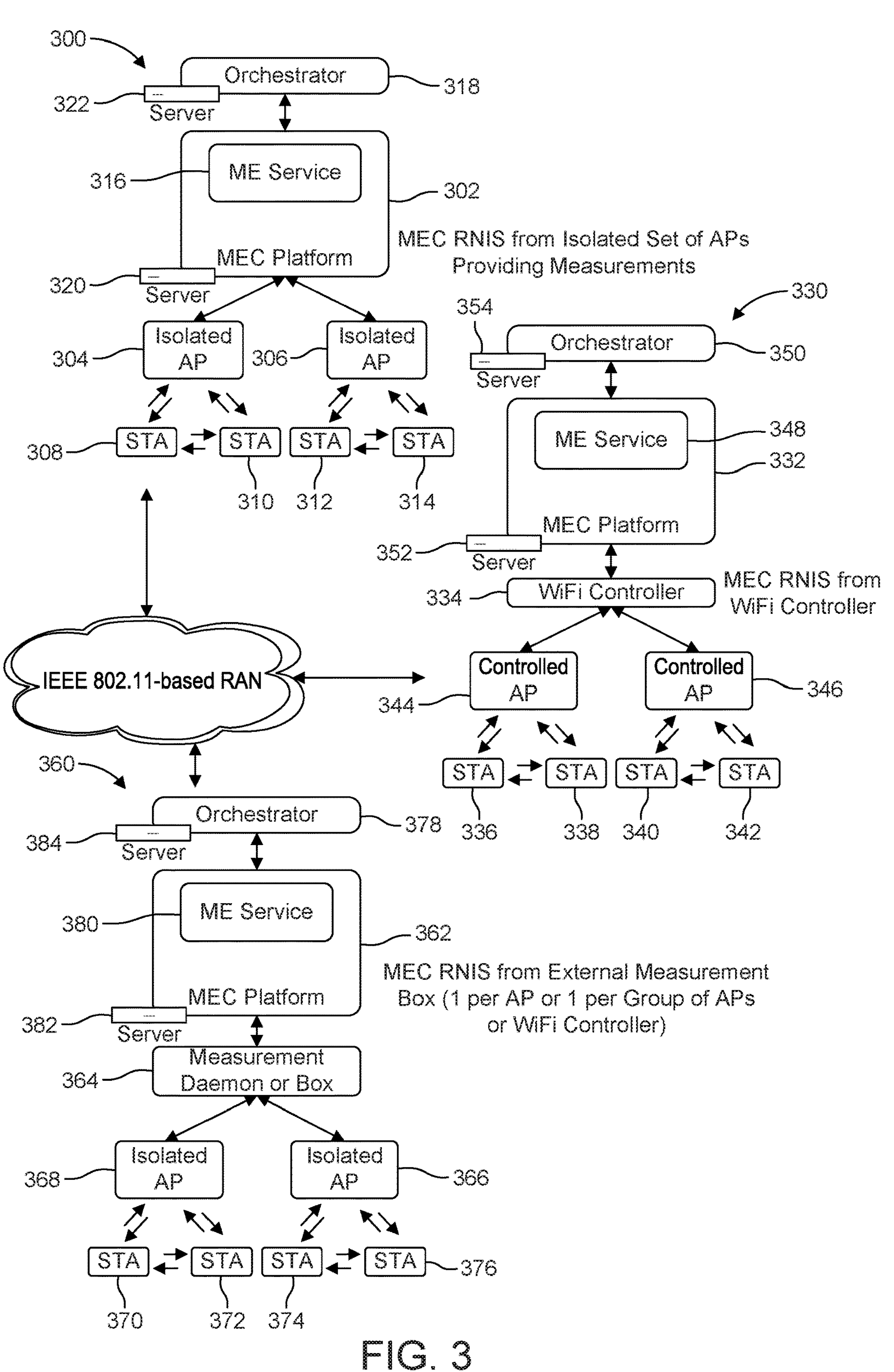
FIG. 3 is an illustration of wireless local area network (WLAN) deployment options and MEC radio network information services (RNIS) interface points.

FIG. 3 is a network diagram which presents three unique options 300, 330, 360 for one or more example deployments. Each of these deployment options 300, 330, 360 correspond to a certain wireless mode of deployment and has associated degree of complexity for the interface between the MEC platform and the wireless domain. It should be noted that the IEEE 802.11 RNIS involves APs and STAs directly as shown. Therefore, for some metrics, an AP may be contacted directly and may take care of performing the measurements, but for some other metrics, the MEC may need to contact separate STAs, which may be end terminals, and may then process the information obtained in a coherent way. Depending on the deployment option chosen, the interface required in order to reach the terminal STAs may increase in complexity.

The topmost option 300 is an example in which an MEC RNIS from an isolated set of APs corresponds to a deployment which does not consider specific infrastructure to coordinate measurements within the IEEE 802.11 network. In this example, the MEC platform 302 has direct access to WLAN APs 304, 306 in the network and therefore to the STAs 308-314 attached to the APs 304-306. In order for the MEC platform 302 to be used in this model of deployment, it may need to implement a complex API that allows the MEC application to connect directly to the STAs to perform measurements, gather the results and then provision all this information to the MEC application or to another MEC service able to process and get meaningful information out the raw data. It should be noted that in order to reach the STA, the measurement request may first transverse the AP. This deployment model may be used to connect residential WiFi access points to the MEC system provided by an operator or venue owner. As an example, an IEEE 802.11 AP located in or near the user premises may be considered. The isolated APs 304, 306 may be logically connected to the MEC to provide measurements for the edge service provider (for example, operator, venue owner, or neutral host) MEC platform 302. This deployment option is the one allowing a higher freedom but also has a higher degree of complexity as compared to others. The MEC platform 302 may interface with an orchestrator 318 and the MEC platform 302 may have at least one ME service 316 running on the platform 302. Both orchestrator 318 and MEC platform 316 may have or may be coupled to one or more servers 320, 322.

The second deployment option 330 a MEC platform may communicate with an MEC RNIS from operating on a WiFi controller 334. This option 330 may be used in conjunction with managed IEEE 802.11 infrastructure equipment, such as ones which may find in airports or conference venues. In this case, the IEEE 802.11 network is controlled by a central controller 334 which configures all the radio and network parameters of the WLAN network, including association of the users, channels, transmission power, etc. In this case, the connection of the MEC platform to the IEEE 802.11 network is performed through interaction with the WiFi controller 334, which may provide a coordinated view of the whole WLAN network. This model of operation may require that the MEC platform provides a southbound interface specific for the controller features, since direct access the STAs 336-342 may not be allowed. The WiFi controller 334 may have all the measurement information directly available at some service access point and the MEC platform may need to interact with the corresponding APs 344-346 at the controller. This interface may become standardized due to the WiFi controller 334 being used to control the APs. This deployment model may lead to lower complexity at the MEC platform, but may also lead to lower flexibility since it may only allow for measurements and other actions that the controller 334 is prepared to perform. It should be noted that since the use of wireless controllers is something quite normal in carrier-owned wireless deployments, this option may be one of the most deployed ones by wireless carriers. The MEC platform 332 may interface with an orchestrator 330 and the MEC platform 332 may have at least one ME service 348 running on the platform 332. Both orchestrator 350 and MEC platform 332 may have or may be coupled to one or more servers 352, 354.

In a third option 360, an MEP platform 362 may be configured to interface with a measurement daemon or box 364 which oversees performing the measurements for a set of, for example, 1 or more APs 366, 368 of isolated WLANs or via a controller or set of controllers, as in combination with the second deployment option 330. In this case, the measurement daemon 364 may be placed in charge of coordinating the different measurement requests and performing the measurements requested, including the generation of specific measurement frames or parsing of received information. This deployment option 360 simplifies the deployment and provides a mechanism by which an existing IEEE 802.11 network may be connected to a MEC platform 362 by the deployment of a new box/software 364 in charge of performing the measurements and reporting the results to the MEC platform 362. This option is a trade-off between the isolated AP option 300 and the WiFi controller option 330. As long as the wireless hardware implements, for example, a standard such as IEEE 802.11k, the measurement daemon may be implemented with whatever functionality the MEC platform requires. STAs 370, 372 may be STAs of isolated AP 368. STAs 374, 376 may be STAs of isolated AP 366. The MEC platform 362 may interface with an orchestrator 378 and the MEC platform 362 may have at least one ME service 380 running on the platform 362. Both orchestrator 378 and MEC platform 362 may have or may be coupled to one or more servers 382, 384.

It should be noted that it is currently assumed that the interface between the RNIS service provider and the underlying IEEE 802.11-based network is proprietary and is not standardized. Alternatively, there may be a standards based interface. The FIGs and examples illustrated herein should be interpreted as non-limited with respect to any standard interface or standards organization. The examples disclosed herein may be applicable to future standardization technologies at ETSI MEC or any other standard body for that matter.

In an embodiment, a configuration of MEC service parameters may be performed by a service consumer. In one embodiment, a configuration of parameters of a certain service may be performed by the service consumer. Other examples may rely on an IEEE 802.11 RNIS, for example, which may provide a WLAN radio information service. However, all of the embodiments and examples may be applied to any ME App and MEC service which requires configuration.

IEEE 802.11 defines several possible measurements that may be requested to an IEEE 802.11 network in order for a requested to understand the current status and radio conditions of the 802.11 network. The current LTE RNIS, as defined in ETSI MEC, may need to configure several parameters in order to obtain any meaningful measurement information. Additionally, LTE RNIS fails to address a request made by a certain STA or AP and a response sent back to the certain STA or AP. In order to get the correct information, the MEC application should indicate the metric, the STA to perform the measurement (terminals) and a moment, for example, a time instance or time period to perform the measurement or measurements.

The following are mechanisms that may be used to configure different 802.11 measurements. Parameters may be configured in accordance with one of two options, both options or any combination of either option and other techniques or implementations.

Figures 4, 5, 6:
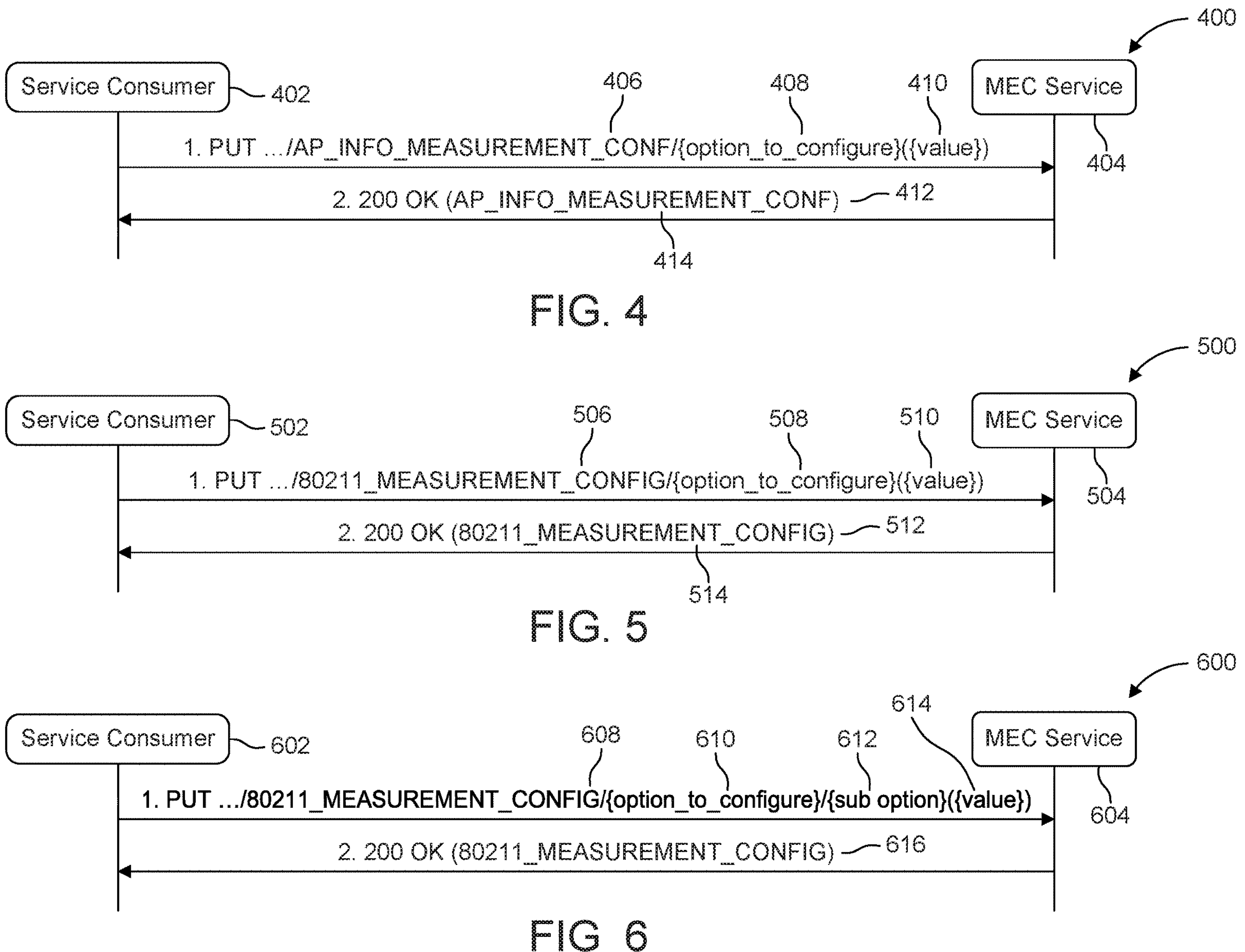
FIG. 4 is a message diagram which illustrates configuring parameters through a request.
FIG. 5 is a message diagram which illustrates a new message format for a measurement configuration.
FIG. 6 is a message diagram which illustrates a new message format including sub options.

FIG. 4 is a message diagram 400 which illustrates a service consumer 402, for example, a MEC app, configuring one or more parameters required of a MEC service 404. The MEC service 404 may be for example an RNIS. In a first option, option 1, a configuration API for each of the measurements may be defined independently. For example, via an AP_INFO_MEASUREMENT_CONF expressed as a PUT message. Parameters are given as part of the PUT message 406 in the request as shown in FIG. 4. The PUT message 406 may be sent from a service consumer 402 to an MEC service 404. An option to configure 408 and a corresponding value 410 may be specified. As shown, messages are HTTP PUT messages. But other HTTP messages or alternatively, other Internet protocol messages may also be used.

Parameters or options to configure 408 may be provided for each of the separated measurement requests at the time the request is sent or done. Each specific service primitive, either request/response or subscription based requires a PUT based API which may be accessed prior to requesting the actual service. The API is split on the different messages defined in the service, so for each request/subscription request, a configuration API exist. Each option to configure may have an associated value 410.

As an example of a particular parameter, IEEE 802.11 provides a channel load metric. In order to perform this measurement, it may be necessary to indicate to the AP the channel to be measured among other parameters. In this example, before requesting the channel load measurement, the interested application may configure the channel by issuing PUT command like "PUT . . . /CHANNEL_LOAD_MEASUREMENT_CONF/Channel 1." In response, the service consumer 402 may receive a 200 OK message including an AP_INFO_MEASUREMENT_CONF 412.

In a second option, option 2, an API for configuration of all measurements may be defined, for example, using an 80211_MEASUREMENT_CONFIG. This option includes use of a specific message for configuring general request parameters for all configurations or configuration options needed. This new message may be used to configure all possible characteristics needed for the service, the format for such may be as given as in FIGS. 4 and 5.

It should be noted that the major difference between option 2 and option 1 is that in option 2 there exists a specific API for service configuration which enables any application to define the specific configuration for the service under a common API. This common API for the configuration may include a hierarchy of options of any complexity as exemplified in FIG. 6.

FIG. 5 is a message diagram 500 which illustrates a new message format for a measurement configuration. As shown in FIG. 5, a service consumer 502 may sent a PUT message 506 to an MEC service 504. The PUT message may include an option to configure 508 and an associated value 510. In response, the MEC service 504 may send the service consumer 502 an OK message 512 which includes an 80211_MEASUREMENT_CONFIG.

FIG. 6 is a message diagram 600 which illustrates a new message format which includes sub options. A service consumer 602 may send an 80211_MEASUREMENT_CONFIG PUT message 608 to an MEC service 604. The PUT message 608 may include an option to configure 610 which has an associated sub option 612 and a value 614. In response, the MEC service 604 may send the service consumer 602 an OK message 616 which includes an 80211_MEASUREMENT_CONFIG.

As an example, an application requesting multiple measurements such as a channel load measurement and a beacon request measurement are considered, as shown in table 1. In table 1, some attributes are described as optional. This is a preferred embodiment, and any absence of an optional notation should not be construed as mandatory to implement. An application may use the API for configuration of the service issuing the following messages:

"PUT . . . /80211_MEASUREMENT_CONFIG/appID/Channel_Load/ChannelID 1"

"PUT . . . /80211_MEASUREMENT_CONFIG/appID/Beacon_Request/SSID test_1"

Table 1 lists example parameters which may be configured:

TABLE 1

| Attribute name | Data type | Cardinality | Description |
|---|---|---|---|
| Common Configuration | | | |
| measurementDuration | Integer | 1 | Duration of the measurement, should be lower than Maximum Measurement Duration in TU as defined in 11.11.4 of IEEE 802.11 |
| randomnInterval | Integer | 1 | Random interval to be used for starting the measurement. In units of TU as specifed in 11.11.3 of IEEE 802.11 |
| Channel Load | | | |
| >ChannelID | Integer | 1 | Channel number which load is reported |
| >Condition | Structure (inlined) | 1 | Contains information on what is being reported |
| >>ReportingCondition | Integer | 1 | 0,1 or 2 as in Table 9-84 of IEEE 802.11-2012 |
| >>ChannelLoadRef | Integer | 1 | Reference value of Channel load as per IEEE 802.11 (clause 11.11.9.3) |
| >ChannelLoad | Integer | 1 | Channel load as per IEEE 802.11-2012 (clause 11.11.9.3) |
| Beacon Request | | | |
| >ChannelID | Integer | 1 | Channel number to scan. A Channel Number of 0 indicates a request to make iterative measurements for all supported channels in the Operating Class where the measurement is permitted on the channel and the channel is valid for the current regulatory domain. A Channel Number of 255 indicates a request to make iterative measurements for all supported channels in the current Operating Class listed in the latest AP Channel Report received from the serving AP |
| >MeasurementMode | Integer | 1 | 0 for passive<br>1 for active<br>2 for beacon table |
| >BSSID | String | 1 . . . N | The BSSID field indicates the BSSID of the BSS(s) for which a beacon report is requested. When requesting beacon reports for all BSSs on the channel, the BSSID field contains the wildcard BSSID |
| >SSID | String | 1 . . . N | (Optional) The SSID subelement indicates the ESS(s) or IBSS(s) for which a beacon report is requested. |
| >Reporting_Condition | Integer | 1 | As in table T9-89 of IEEE802.11 |
| Frame Request | | | |
| >ChannelID | Integer | 1 | Channel number for which the measurement applies |
| >FrameReport | Integer | 1 | The Frame Request Type indicates which subelements are requested in the Frame Report. The value of 1 signifies that a Frame Count Report is requested. The values 0 and 2 to 255 are reserved. |
| >MACAddress | String | 1 | If the MAC Address field is the broadcast address, then all frames are counted towards the Frame Report generated in response to this frame request. For other MAC addresses, only frames matching this MAC address as the Transmitter Address are counted towards the Frame Report generated in response to this frame request. |
| STA Statistics Request | | | |
| >MACAddress | String | 1 | The Peer MAC Address field is the RA or TA MAC address for the frame statistics of this measurement. |

TABLE 1-continued

Figure 9:
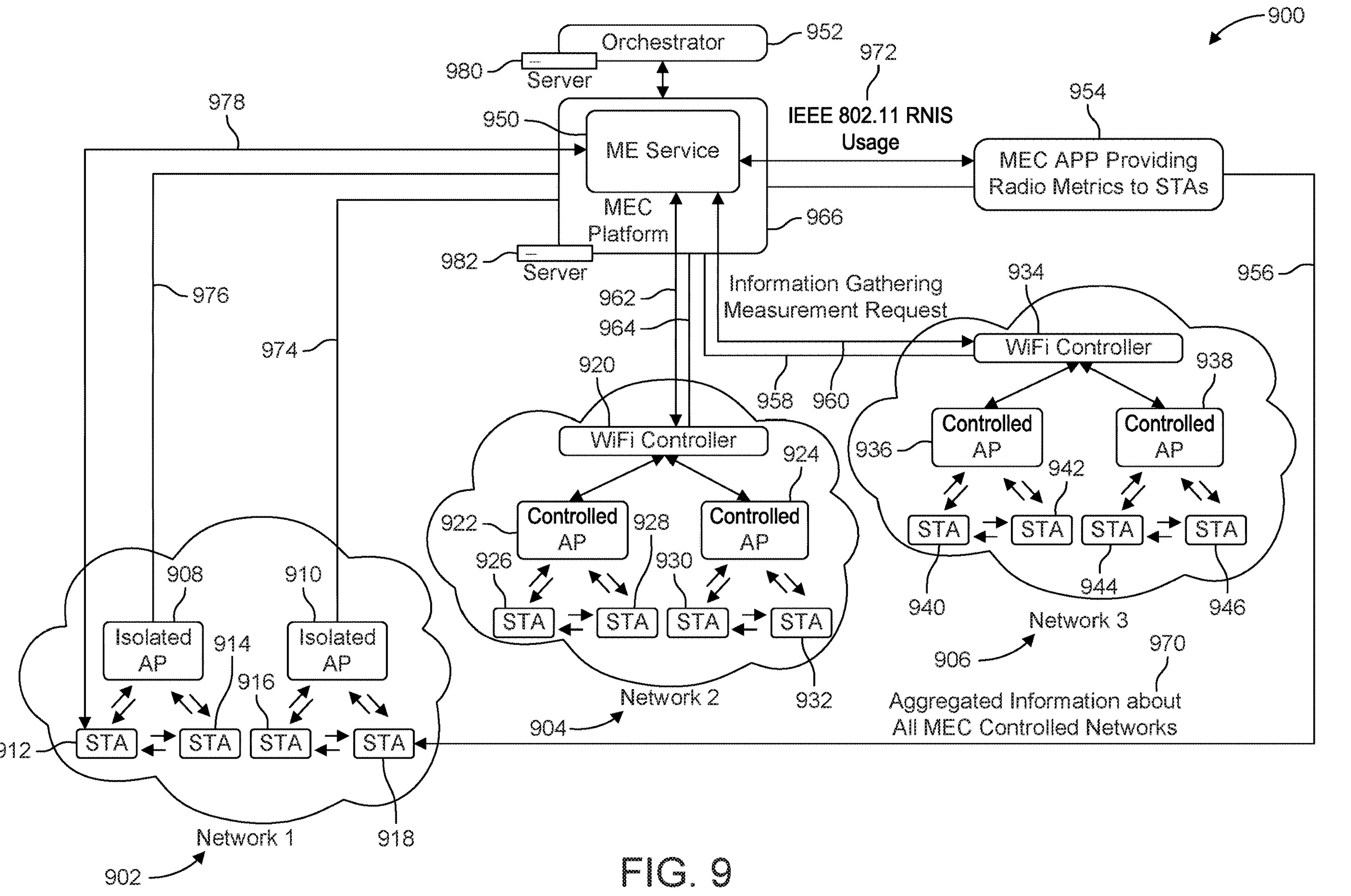
FIG. 9 is an illustration of a STA obtaining information about surrounding networks from an MEC app.

| Attribute name | Data type | Cardinality | Description |
|---|---|---|---|
| >GroupIdentity | Integer | 1 | As per tables T 9-114 of IEEE 802.11 |
| In case STA Statistic Request with triggered results is selected then add the following parameters (need to amend how subscriptions are done) | | | |
| >TriggeredReport | Bool | 1 | Yes, use triggered report |
| >TriggerTimeout | Integer | 1 | The Trigger Timeout field contains a value in units of 100 TUs during which a measuring STA does not generate further triggered STA Statistics Reports after a trigger condition has been met. |
| >TriggerCondition | 16bits bitmap | 1 | As per Figure 9-161 of IEEE 802.11 |
| >failedCount | Integer (4 bytes) | 1 | (Optional) Present if TriggerCondition has a 1 in Bit 0 |
| >FCSError | Integer (4 bytes) | 1 | (Optional) Present if TriggerCondition has a 1 in Bit 1 |
| >MultipleRetryCount | Integer (4 bytes) | 1 | (Optional) Present if TriggerCondition has a 1 in Bit 2 |
| >FrameDuplicateCount | Integer (4 bytes) | 1 | (Optional) Present if TriggerCondition has a 1 in Bit 3 |
| >RTSFailureCount | Integer (4 bytes) | 1 | (Optional) Present if TriggerCondition has a 1 in Bit 4 |
| >ACKFailureCount | Integer (4 bytes) | 1 | (Optional) Present if TriggerCondition has a 1 in Bit 5 |
| >RetryCount | Integer (4 bytes) | 1 | (Optional) Present if TriggerCondition has a 1 in Bit 6 |

A configuration of parameters through an intervention by an MEPM may be employed in an embodiment. Mechanisms for direct configuration of the service parameters by the application, for example, a WLAN RNIS configuration by an ME app may also be employed or implemented. These mechanisms may require that an application, for example, an ME app configures all parameters for all the service primitives required. The service primitives may be akin to measurements but may also represent other non-measurement information. This requirement is a complexity burden which might not be assumable by an application. In an embodiment, a mechanism by which the MEPM is able to configure the default value of some of the configuration parameters may be utilized, thus reducing the complexity of the applications.

In a first option, all parameters or a subset of all parameters may be configured by the MEPM, to be used as default by some or all MEC applications. This may require a modification to the Mm5 interface 738 shown in FIG. 7. The Mm5 reference point may be required to perform platform configuration, configuration of the application rules and requirements, application lifecycle support procedures, management of application relocation, and the like. The MEPM 728 is located in the management plane of the MEC platform and as such it may be located in the same infrastructure where the MEC platform resides or in a different infrastructure, for example, on a different server in same data center which may be logically connected to the MEC platform by Mm5. In an embodiment, the MEPM 728 may be located in the MEC platform 704. After successful connection of the IEEE 802.11 network to the MEC platform, the MEPM 728 may configure the required parameters for the service. The default values for the service may be provided by administrator configuration or by any automatic process.

Figure 7:
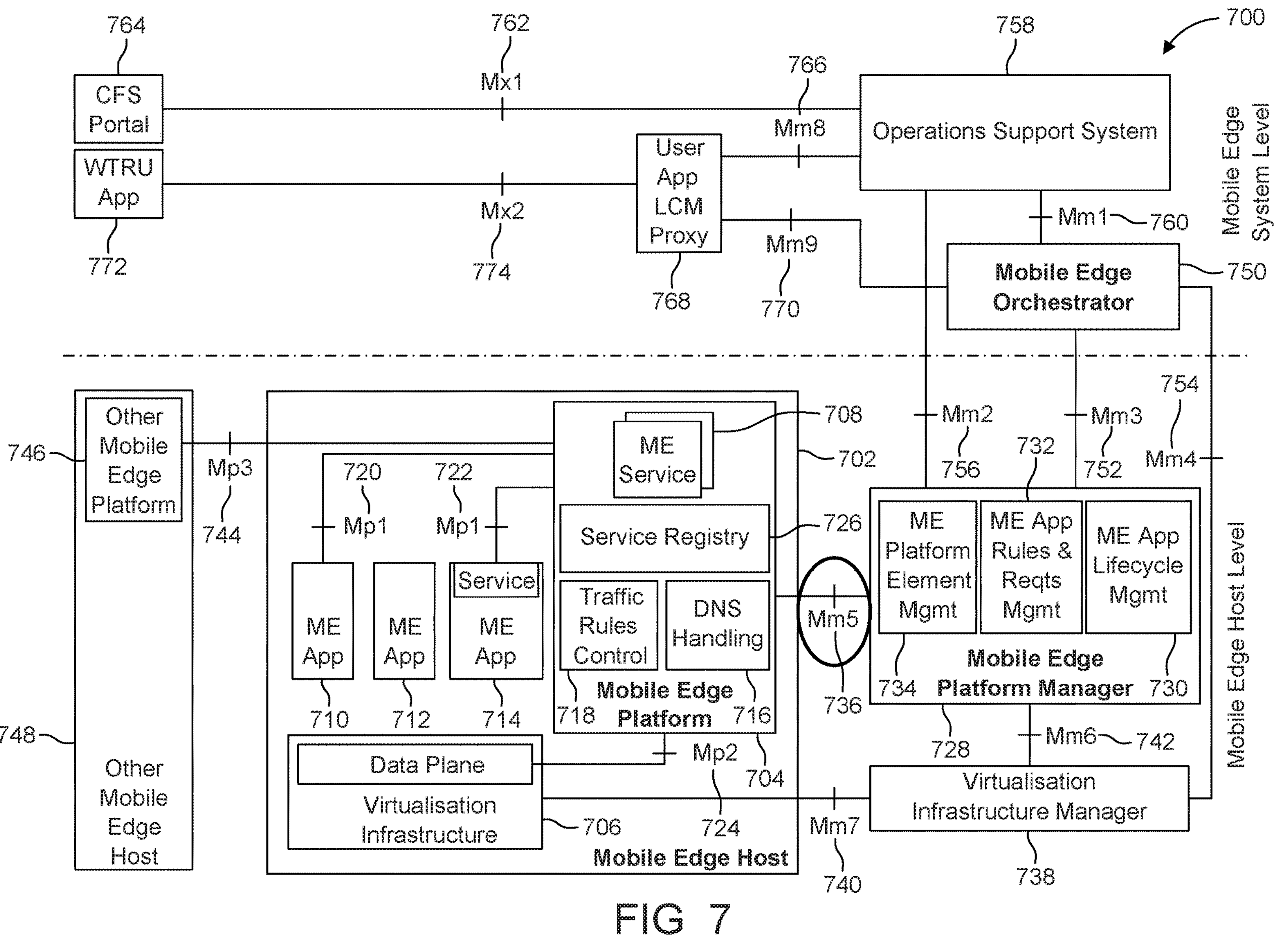
FIG. 7 is an illustration of an Mm5 interface.

Much like FIG. 2, FIG. 7 illustrates an example ETSI MEC architecture. As shown in FIG. 7, a MEH 702 is an entity that contains a MEP 704 and a virtualization infrastructure 706. An MEP 704 may include a collection of essential functionality to run mobile edge applications on a virtualization infrastructure. ME apps 710, 712, 714 may be instantiated on the virtualization infrastructure 706 of the MEH 702 based on a configuration or based on requests validated by mobile edge management. MEP 704 may include one or more ME services 708, a service registry 726 and may provide for traffic rules control 718 and DNS handling 716. ME apps 710, 712, 714 may be configured to communicate with the MEP 704 via an Mp1 reference point 720, 722. Reference point Mp2 724 may provide an interface between MEP 704 and virtualization infrastructure 706. In one embodiment, reference points may be used to connect one or more functional elements.

A MEPM 728 may manage an application life cycle 730 and may provide element management functions 734 to an MEP. The MEPM 728 may also manage application rules and requirements 732. Mobile Edge Services (ME services) 708 may be hosted on the MEP 704 and may offer a range of capabilities, including: communication services, traffic loading services and location services. ME services may also store or provide radio network information. ME services may be natively provided in the MEP or registered as add-on services by 3rd parties.

MEPM 728 may be in communication with MEP 704 via the Mm5 reference point 736. MEPM 728 may also communicate with a virtualization infrastructure manger 738 via the Mm6 reference point 742. Virtualization infrastructure manager 738 may be in communication with virtualization infrastructure via the Mm7 reference point 740. An Mp3 reference point 744 connects other mobile edge platforms 746 of other mobile edge hosts 748 to the MEP.

A mobile edge orchestrator 750 may communicate with MEPM 728 via Mm3 752 and with virtualization infrastructure manager 738 via Mm4 reference point 754. Reference point Mm2 756 may be used to connect an operations support system 758 to the MEPM 728. Operations support system 758 may interface with the mobile edge orchestrator 750 via reference point Mm1 760. Reference point Mx1 762 may connect the operations support system 758 to a CFS portal 764. Reference point Mm8 766 may connect the operations support system 758 to a user application lifecycle management (LCM) proxy 768 which is coupled to the mobile edge orchestrator 750 via Mm9 770. The user application LCM proxy 768 may interface with UE applications 772 via Mx2 274.

In a second option, which may incorporate a mix of both MEPM configuration and application intelligence, the MEPM configures default values and ME apps may be have the choice to modify them through a PUT message or any other message. In one embodiment, the MEPM may configure the default values and provide the values to the application. The application may follow up with a PUT message in response.

In an embodiment, a MEC service manager orchestrates MEC service requests. For a given MEC service, it may be that multiple ME applications request the service to perform some action or function and the service may be overloaded with requests or the requests may cause conflicts within the MEC service or in the underlying WLAN RAT. It may also be that an abundance of requests for a particular service may cause the overloading. As an example, considering IEEE 802.11 RNIS embodiments, it may occur that multiple applications request multiple measurements concurrently. If the number of requests is large enough, the wireless medium may be overloaded with measurements and may not be able to produce any communication or provide meaningful measurement responses to the requestors. In order to avoid such a scenario, the MEC service platform may include a means or mechanism for orchestrating and ordering the requests so the medium is not overloaded.

Figure 8:
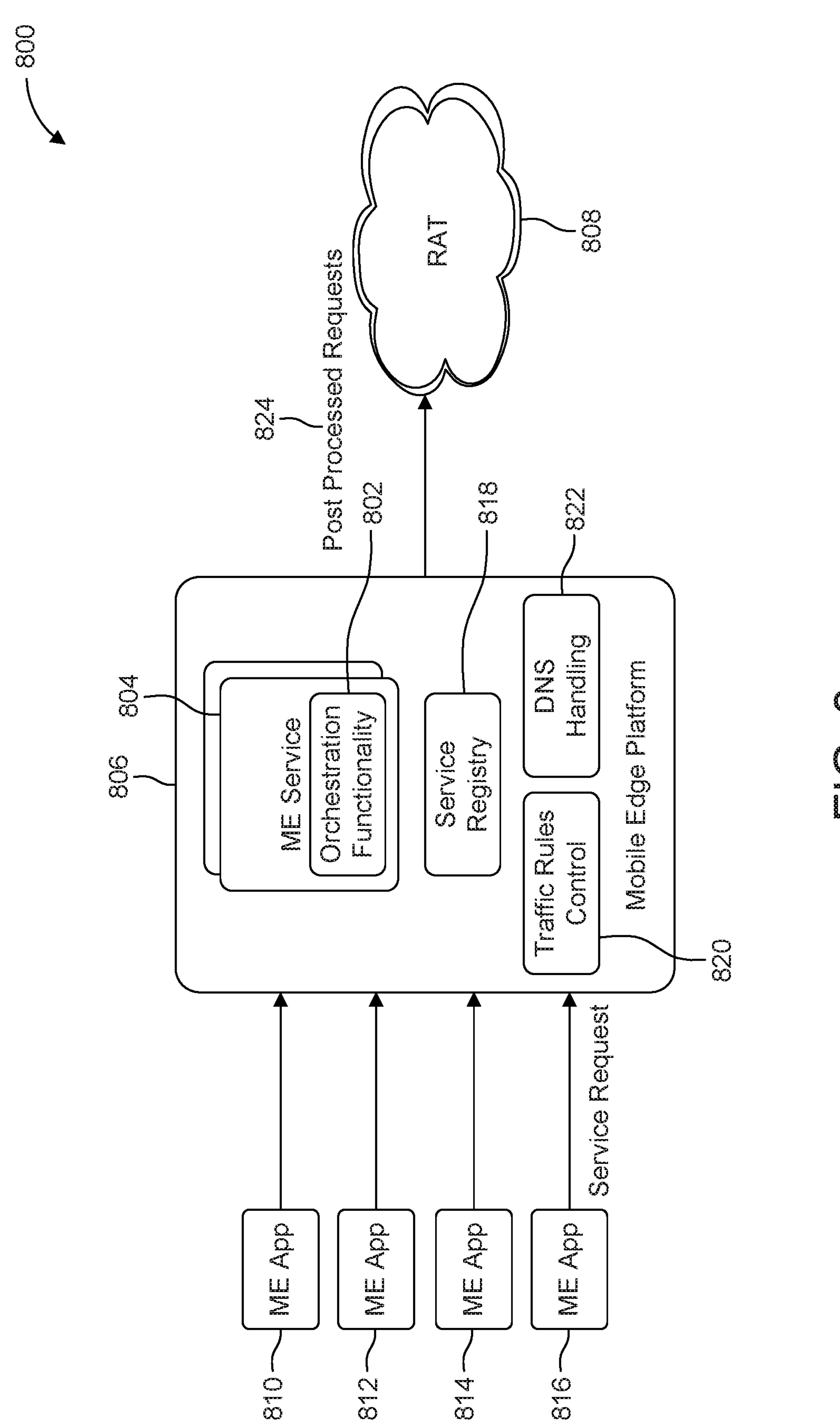
FIG. 8 is an illustration of an example orchestration functionality.

FIG. 8 illustrates a functional diagram 800 showing orchestration functionality 802. The orchestration functionality 802 may operate as follows. The orchestration functionality 802 of an ME service 804 running on an MEP 806 may listen to any or all service requests that require or request access to the RAT 808. Once a new request is received from one or more ME apps 810-816, the orchestration functionality 802 may check whether the new request is compatible with previous requests, for example, that it may be performed without affecting the other requests. If the request may be performed, then the orchestration functionality 802 may look for the best way of performing the current set of service requests in a bundle. Post processed requests 824 may be output from the orchestration functionality towards the RAT 808. On the contrary case, the orchestration functionality 802 may return an error message, to one or more ME apps, indicating the cause of the failure. One or several sequential bundles of request/responses are exchanged with the RAT in order to perform the service and come back with the result. MEP 806 includes service registry 818 and DNS handling 822. DNS handling 822 may include translating a domain name into an IP address. In one embodiment, DNS handling 822 may employ caching to reduce time spent on translating domain names. Service registry 818 may provide support for more low-latency mobile edge services. DNS handling 822 may translate domain names included in PUT requests or any other message format for that matter.

In an embodiment, a protocol for some messages directed to or from an IEEE 802.11 RNIS is defined. The current ETSI MEC RNIS is based on a request/response or subscription/notification API via REST. In order to define the IEEE 802.11 RNIS, the same paradigm may be used, providing some measurements which are based on request/response and others based on subscription/notification.

An API may be defined in accordance with the following two ways of defining an RNIS for new technologies. A first example option may employ a newly defined API which is specified for each radio technology which may include separate services and APIs for WLAN and LTE. As a second option, an API may extend the current LTE RNIS API, including new IEEE 802.11 related parameters. Although ETSI MEC is defining service APIs in a REST format, any specific format may be used independent of the API framework.

A NetworkInfo or Network Info Message, as illustrated by Table 2, may provide information about the underlying IEEE 802.11 network for which information may be gathered.

A new functionality primitive may indicate that an MEC application is able to get information of an underlying IEEE 802.11 network. The information may include basic information including the number of different networks, characterized by their SSIDs and BSSIDs and their roaming and interconnection capabilities. Through this primitive, the application may learn what the IEEE 802.11 infrastructure is connected to and may get information on the availability of the network for the stations accessing the application, for example, whether or not the stations support the roaming agreements of the network and whether or not they may connect to it.

TABLE 2

WLAN RNIS - Network Info Message

| Attribute name | Data type | Cardinality | Description |
|---|---|---|---|
| timeStamp | TimeStamp | 0 . . . 1 | Time stamp. |
| appInsId | String | 1 | Unique identifier for the mobile edge application instance. |
| Ieee8021Id | Structured (inlined) | 1 . . . N | Structure containing information regarding the IEEE 802.11 network connected<br>Optional parameter if IEEE 802.11 technology is selected as techID |
| >ssId | String | 1 | SSID element as defined IEEE 802.11 (clause 9.4.2.2) |
| >apInfo | Structured (inlined) | 1 . . . N | Structure containing information per AP belonging to the ssID |
| >>bssId | String | 1 | One or more BSSIDs of the APs belonging to this network. Parameter defined in IEEE 802.11 |
| >>mbssd | String | 1 . . . N | One or more Multiple BSSID elements as defined in IEEE 802.11 (clause 9.4.2.48) |

TABLE 2-continued

| WLAN RNIS - Network Info Message | | | |
|---|---|---|---|
| Attribute name | Data type | Cardinality | Description |
| >>MDEId | String | 1 | Mobility Domain Element as defined in IEEE 802.11 (9.4.2.47) |
| >Country | String | 1 . . . N | Country Element as defined in IEEE 802.11 (9.4.2.9) |
| >Interworking | String | 1 | Interworking Element as defined in IEEE 802.11 (9.4.2.92) |
| >Roaming Consortium | String | 1 | Roaming Consortium Element as defined in IEEE 802.11 (9.4.2.96) |

A combined RAT RNIS network info message is shown in Table 3. A message or message format could be combined with an existing PlmnInfo message defined in the current MEC LTE RNIS specification, by including a technology identifier (techId). In one embodiment, a techId which specifies either an IEEE or 3GPP format may be used as shown in Table 3. In some embodiments, a techId field may be more granular and specify a particular 3GPP or 802.11 release. For example, 3GPP R8-R16 may be specified. With respect to 802.11, releases may include 802.11ac, 802.11ad, 802.11ax, 802.11ay or the like. 802.11 releases may also be specified in terms of a version number, for example, Wi-Fi 5, Wi-Fi 6, Wi-Fi 7 or the like. Any other releases may be specified or denoted by a message.

A new functionality primitive may extend the PlmnInfo message and provide the same information as a previous one, but may also extend the LTE RNIS. In this way, applications may be able to get a view of the complete set of RATs connected to the MEC platform, without the need to request network information through multiple APIs or from multiple differing devices or technologies.

TABLE 3

| Combined RAT RNIS - Network Info Message | | | |
|---|---|---|---|
| Attribute name | Data type | Cardinality | Description |
| timeStamp | TimeStamp | 0 . . . 1 | Time stamp. |
| appInsId | String | 1 | Unique identifier for the mobile edge application instance. |
| techId | String | 1 | Unique identifier of the technology e.g., 0 3GPP LTE 1 IEEE 802.11 |
| ecgi | Structure (inlined) | 1 . . . N | E-UTRAN Cell Global Identifier as defined in ETSI TS 136 413. Optional parameter if 3GPP LTE technology is selected as techID |
| >mcc | String | 1 | The Mobile Country Code part of PLMN Identity as defined in ETSI TS 136 413. |
| >mnc | String | 1 | The Mobile Network Code part of PLMN Identity as defined in ETSI TS 136 413. |
| >cellId | String | 1 | The E-UTRAN Cell Identity as a bit string (size (28), as defined in ETSI TS 136 413. |
| Ieee80211Id | Structured (inlined) | 1 . . . N | Structure containing information regarding the IEEE 802.11 network connected Optional parameter if IEEE 802.11 technology is selected as techID |
| >ssId | String | 1 | SSID element as defined IEEE 802.11 (clause 9.4.2.2) |
| >apInfo | Structured (inlined) | 1 . . . N | Structure containing information per AP belonging to the ssID |
| >>bssId | String | 1 | One or more BSSIDs of the APs belonging to this network. Parameter defined in IEEE 802.11 |
| >>mbssd | String | 1 . . . N | One or more Multiple BSSID elements as defined in IEEE 802.11 (clause 9.4.2.48) |
| >>MDEId | String | 1 | Mobility Domain Element as defined in IEEE 802.11-2012 (9.4.2.47) |
| >Country | String | 1 . . . N | Country Element as defined in IEEE 802.11 (9.4.2.9) |
| >Interworking | String | 1 | Interworking Element as defined in IEEE 802.11 (8.4.2.92) |
| >Roaming Consortium | String | 1 | Roaming Consortium Element as defined in IEEE 802.11 (9.4.2.96) |

An APInfo message may correspond to a RabInfo message for the LTE RNIS. In one embodiment, another message for each IEEE 802.11 AP may provide information on users, capabilities and/or capacities of the AP. In the case of IEEE 802.11, it may be preferable to provide some information regarding the STAs associated with an AP and also the channel load for the different APs. Regarding the channel load, it may be required to configure different values for the measurement or measurements to take place. In the following examples given, the APInfo message provides information on the APs and the STAs associated with them.

A new functionality primitive may be fundamental for any application providing mobility, local breakout or traffic steering in general. Through this primitive, an application may get a view of the STAs connected to a certain network and what the current channel load is on the network. This information may be critical to understand the performance achieved by a STA and the traffic steering options available. Table 4 illustrates attributed for providing relevant AP information relating to associated STAs and channel load.

TABLE 4

WLAN RNIS - AP Info

| Attribute name | Data type | Cardinality | Description |
|---|---|---|---|
| timeStamp | TimeStamp | 0 . . . 1 | Time stamp. |
| appInsId | String | 1 | Unique identifier for the mobile edge application instance. |
| requestId | String | 1 | Unique identifier allocated by the mobile edge application for the Information request. |
| Ieee80211Id | Structured (inlined) | 1 . . . N | Structure containing information regarding the IEEE 802.11 network connected Optional parameter if IEEE 802.11 technology is selected as techID |
| >ssId | String | 1 | SSID element as defined IEEE 802.11 (clause 9.4.2.2) |
| >apInfo | Structured (inlined) | 1 . . . N | Structure containing information per AP belonging to the ssID |
| >>bssId | String | 1 | One or more BSSIDs of the APs belonging to this network. Parameter defined in IEEE 802.11 |
| >>mbssd | String | 1 . . . N | One or more Multiple BSSID elements as defined in IEEE 802.11 (clause 9.4.2.48) |
| >>MDEId | String | 1 | Mobility Domain Element as defined in IEEE 802.11-2012 (9.4.2.47) |
| >Country | String | 1 . . . N | Country Element as defined in IEEE 802.11 (9.4.2.9) |
| >Interworking | String | 1 | Interworking Element as defined in IEEE 802.11 (8.4.2.92) |
| >Roaming Consortium | String | 1 | Roaming Consortium Element as defined in IEEE 802.11 (9.4.2.96) |
| StaInfo | Structured (inlined) | 1 . . . N | Information on STAs associated to the APs |
| >StaId | String | 1 | MAC address of the STA, used as identifier, 6-octet IEEE 802 MAC address |
| >BssId | String | 1 | BSSID of the AP which the STA is associated to. 6-octet IEEE 802 MAC address |
| ApChannelLoad | Structured (inlined) | 1 . . . N | Structure providing the channel load of the AP for a given channel |
| >BssId | String | 1 | BSSID Identifier of the AP. 6-octet IEEE 802 MAC address |
| >ChannelID | Integer | 1 | Channel number which load is reported |
| >Condition | Structure (inlined) | 1 | Contains information on what is being reported |
| >>ReportingCondition | Integer | 1 | 0,1 or 2 as in Table 9-84 of IEEE 802.11-2012 |
| >>ChannelLoadRef | Integer | 1 | Reference value of Channel load as per IEEE 802.11 (clause 11.11.9.3) |
| >ChannelLoad | Integer | 1 | Channel load as per IEEE 802.11-2012 (clause 11.11.9.3) |

A new response message may be defined in order to get a beacon request measurement. This assumes that a configuration of the required parameters to perform the measurement has already been done.

Using a new functionality primitive, an application may get information on what access points are available for handover for a certain STA. Through this primitive, the application may monitor which APs are relevant handover options for the STA. Then, the application or STA may make a mobility decision based on the current status of the radio network the STA is connected to and the choices reported by the AP. Table 5 illustrates a WLAN RNIS beacon request message.

TABLE 5

| WLAN RNIS - Beacon Request Message | | | |
|---|---|---|---|
| Attribute name | Data type | Cardinality | Description |
| timeStamp | TimeStamp | 0 . . . 1 | Time stamp. |
| appInsId | String | 1 | Unique identifier for the mobile edge application instance. |
| requestId | String | 1 | Unique identifier allocated by the mobile edge application for the Information request. |
| beaconReport | Structure (inlined) | 1 . . . N | |
| >STA_ID | String | 1 | Identifier of the STA to perform the measurement. It might be a STA-AP or a non-AP STA. IEEE 802 48 bits MAC address |
| >ESSID | String | 1 | ESSID to which the STA performing the measurement is connected to |
| >BSSID | String | 1 | BSSID to which the STA performing the measurement is connected to |
| >operatingClass | Integer | 1 | Operating Class indicates the channel set for which the measurement request applies. Valid values of Operating Class are shown in Annex E of IEEE 802.11. |
| >channelNumber | Integer | 1 . . . N | Channel Number indicates the channel number for which the measurement report applies. Channel Number is defined within an Operating Class as shown in Annex E of IEEE 802.11 |
| >condensedPhyInfo | Integer | 1 | Condensed PHY Type indicates the physical medium type on which the Beacon, Measurement Pilot, or Probe Response frame being reported was received. It has an integer value between 0 and 127 coded according to the value of dot11PHYType. |
| >reportedFrameType | Bool | 1 | Reported Frame Type indicates the type of frame reported. A value of 0 indicates a Beacon or Probe Response frame; a value of 1 indicates a Measurement Pilot frame. |
| >RCPI | Integer | 1 | RCPI indicates the received channel power of the Beacon, Measurement Pilot, or Probe Response frame, which is a logarithmic function of the received signal power, as defined in the RCPI measurement sub clause for the indicated PHY Type on IEEE 802.11. |
| >RSNI | Integer | 1 | RSNI indicates the received signal to noise indication for the Beacon, Measurement Pilot, or Probe Response frame, as described in 9.4.2.3 of IEEE 802.11-2012. |
| >AntenaID | Integer | 1 | The Antenna ID field contains the identifying number for the antenna(s) used for this measurement. Antenna ID is defined in 9.4.2.40 of IEEE 802.11. |
| >frameBSSID | String | 1 | BSSID contained in the frame reported |

Subscription messages may be used by an MEC platform in addition to or in place of HTTP type messages. The MEC platform may provide a subscription service to which an application may request information in the form of a notification of events. A subscription/notification tuple may be defined for use with an IEEE 802.11 based API.

A BSSChangeSubscription message may provide information on the mobility of the end users associated with an IEEE 802.11 network. New functionality may be implemented in an 802.11 information subscription service. For example, an application may subscribe to the mobility events of a STA in order to be informed of the location of the STA. Location mobility events may include any change in movement at any moment. Alternatively, mobility events may be periodic in nature and may be based on a threshold of movement or on a timer. This example functionality may be required by an application trying to balance the usage of the RAN, perform traffic steering and optimize performance, since a handover may typically degrade the performance of the STA at least temporarily. Table 6 illustrates example attributes related to a BSS change subscription.

TABLE 6

| WLAN RNIS -BSS Change Subscription | | | |
|---|---|---|---|
| Attribute name | Data type | Cardinality | Description |
| callbackReference | Universal resource indicator (URI) | 1 | URI selected by the mobile edge application to receive notifications on the subscribed RNIS information. This shall be included both in the request and in response. |
| _links | Structure (inlined) | 0 . . . 1 | List of hyperlinks related to the resource. This shall be only included in the HTTP responses and in HTTP PUT requests. |
| >self | LinkType | 1 | Self referring URI. The URI shall be unique within the RNI API as it acts as an ID for the subscription. |
| filterCriteriaAssocHo | Structure (inlined) | 1 | List of filtering criteria for the subscription. Any filtering criteria from below, which is included in the request, shall also be included in the response. |
| >appInsId | String | 0 . . . 1 | Unique identifier for the mobile edge application instance. |
| >associateId | AssociateId | 0 . . . N | 0 to N identifiers to associate the information for a specific UE or flow. |
| >STAId | String | 1 | ID of the IEEE 802.11 card, MAC address, 6 bytes compliant IEEE 802 MAC address |
| Ieee80211Id | Structured (inlined) | 1 . . . N | Structure containing information regarding the IEEE 802.11 network connected<br>Optional parameter if IEEE 802.11 technology is selected as techID |
| >ssId | String | 1 | SSID element as defined IEEE 802.11 (clause 9.4.2.2) |
| >apInfo | Structured (inlined) | 1 . . . N | Structure containing information per AP belonging to the ssID |
| >>bssId | String | 1 | One or more BSSIDs of the APs belonging to this network. Parameter defined in IEEE 802.11 |
| >>mbssd | String | 1 . . . N | One or more Multiple BSSID elements as defined in IEEE 802.11 (clause 9.4.2.48) |
| >>MDEId | String | 1 | Mobility Domain Element as defined in IEEE 802.11 (9.4.2.47) |
| >Country | String | 1 . . . N | Country Element as defined in IEEE 802.11 (9.4.2.9) |
| >Interworking | String | 1 | Interworking Element as defined in IEEE 802.11 (9.4.2.92) |
| >Roaming Consortium | String | 1 | Roaming Consortium Element as defined in IEEE 802.11 (9.4.2.96) |
| > hoStatus | Enum | 0 . . . N | In case hoStatus is not included in the subscription request, the default value 3 = COMPLETED shall be used and included in the response.<br>1 = IN_PREPARATION. 2 = IN_EXECUTION. 3 = COMPLETED. 4 = REJECTED.<br>5 = CANCELLED. |
| expiry Deadline | TimeStamp | 0 . . . 1 | Time stamp. |

A BSSChangeNotification may provide an answer to the previous BSS change subscription message. The following definition provides an example message format with example attributes.

TABLE 7

| WLAN RNIS - BSS Change Notification | | | |
|---|---|---|---|
| Attribute name | Data type | Cardinality | Description |
| callbackReference | URI | 1 | URI selected by the mobile edge application to receive notifications on the subscribed RNIS information. This shall be included both in the request and in response. |

TABLE 7-continued

| WLAN RNIS - BSS Change Notification | | | |
|---|---|---|---|
| Attribute name | Data type | Cardinality | Description |
| _links | Structure (inlined) | 0 . . . 1 | List of hyperlinks related to the resource. This shall be only included in the HTTP responses and in HTTP PUT requests. |
| >self | LinkType | 1 | Self referring URI. The URI shall be unique within the RNI API as it acts as an ID for the subscription. |
| filterCriteriaAssocHo | Structure (inlined) | 1 | List of filtering criteria for the subscription. Any filtering criteria from below, which is included in the request, shall also be included in the response. |
| >appInsId | String | 0 . . . 1 | Unique identifier for the mobile edge application instance. |
| >associateId | AssociateId | 0 . . . N | 0 to N identifiers to associate the information for a specific UE or flow. |
| >STAId | String | 1 | ID of the IEEE 802.11 card, MAC address, 6 bytes compliant IEEE 802 MAC address |
| Ieee80211Id | Structured (inlined) | 1 . . . N | Structure containing information regarding the IEEE 802.11 network connected<br>Optional parameter if IEEE 802.11 technology is selected as techID |
| >ssId | String | 1 | SSID element as defined IEEE 802.11 (clause 9.4.2.2) |
| >apInfo | Structured (inlined) | 1 . . . N | Structure containing information per AP belonging to the ssID |
| >>bssId | String | 1 | One or more BSSIDs of the APs belonging to this network. Parameter defined in IEEE 802.11 |
| >>mbssd | String | 1 . . . N | One or more Multiple BSSID elements as defined in IEEE 802.11 (clause 9.4.2.48) |
| >>MDEId | String | 1 | Mobility Domain Element as defined in IEEE 802.11 (9.4.2.47) |
| >Country | String | 1 . . . N | Country Element as defined in IEEE 802.11 (9.4.2.9) |
| >Interworking | String | 1 | Interworking Element as defined in IEEE 802.11 (9.4.2.92) |
| >Roaming Consortium | String | 1 | Roaming Consortium Element as defined in IEEE 802.11 (9.4.2.96) |
| > hoStatus | Enum | 0 . . . N | In case hoStatus is not included in the subscription request, the default value 3 = COMPLETED shall be used and included in the response.<br>1 = IN_PREPARATION. 2 = IN_EXECUTION. 3 = COMPLETED. 4 = REJECTED. 5 = CANCELLED. |
| expiry Deadline | TimeStamp | 0 . . . 1 | Time stamp. |

Table 7 illustrates BSS Change Notification attributes. In one embodiment, a BSSChange exchange may be implemented as an extension to the current RNIS by including a new technology identifier in a CellChange exchange. The technology identifier may indicate whether the technology is IEEE 802.11 or a 3GPP based technology. In one embodiment, the technology indicator may indicate a fifth generation technology.

Reporting the mobility of the user in a common way for both LTE and IEEE 802.11 may be potentially interesting for applications which consider aggregation of LTE and IEEE 802.11 technologies. This may reduce the number of API calls required to implement the application. Table 8 illustrates point of attachment (PoA) attributes which may be used by a STA during handover or other PoA changes/configurations.

TABLE 8

| Combined RAT RNIS - Point of Attachment (PoA) Change | | | |
|---|---|---|---|
| Attribute name | Data type | Cardinality | Description |
| timeStamp | TimeStamp | 0 . . . 1 | Time stamp. |
| associateId | AssociateId | 0 . . . N | 0 to N identifiers to associate the event for a specific UE or flow. |
| techId | String | 1 | Unique identifier of the technology<br>e.g.,<br>0 3GPP LTE<br>1 IEEE 802.11 |

TABLE 8-continued

| Combined RAT RNIS - Point of Attachment (PoA) Change | | | |
|---|---|---|---|
| Attribute name | Data type | Cardinality | Description |
| srcEcgi | Structure (inlined) | 1 | The E-UTRAN Cell Global Identifier of the source cell as defined in ETSI TS 136 413 [i.3]. Optional parameter if 3GPP LTE technology is selected as techID |
| >mcc | String | 1 | The Mobile Country Code part of PLMN Identity as defined in ETSI TS 136 413 [i.3]. |
| >mnc | String | 1 | The Mobile Network Code part of PLMN Identity as defined in ETSI TS 136 413 [i.3]. |
| >cellId | String | 1 | The E-UTRAN Cell Identity as a bit string (size (28), as defined in ETSI TS 136 413 [i.3]. |
| trgEcgi | Structure (inlined) | 1 . . . N | The E-UTRAN Cell Global Identifier of the target cell as defined in ETSI TS 136 413 [i.3]. NOTE: Cardinality N is valid only in case of statuses IN_PREPARATION, REJECTED and CANCELLED. Optional parameter if 3GPP LTE technology is selected as techID |
| >mcc | Integer | 1 | The Mobile Country Code part of PLMN Identity as defined in ETSI TS 136 413 [i.3]. |
| >mnc | Integer | 1 | The Mobile Network Code part of PLMN Identity as defined in ETSI TS 136 413 [i.3]. |
| >cellId | String | 1 | The E-UTRAN Cell Identity as a bit string (size (28), as defined in ETSI TS 136 413 [i.3]. |
| srcBSSID | Structure (inline) | 1 | Source IEEE 802.11 network Optional parameter if IEEE 802.11 technology is selected as techID |
| >ESSID | String | 1 | ESSID of the source network |
| >BSSID | String | 1 | BSSID of the source AP |
| trgBSSID | Structure (inline) | 1 . . . N | Target IEEE 802.11 network. NOTE: Cardinality N is valid only in case of statuses IN_PREPARATION, REJECTED and CANCELLED. Optional parameter if IEEE 802.11 technology is selected as techID |
| >ESSID | String | 1 | ESSID of the source network |
| >BSSID | String | 1 | BSSID of the source AP |
| hoStatus | Enum | 1 | Indicate the status of the UE handover procedure. Values are defined as following: 1 = IN_PREPARATION. 2 = IN_EXECUTION. 3 = COMPLETED. 4 = REJECTED. 5 = CANCELLED. |
| tempUeId | Structure (inlined) | 0 . . . 1 | The temporary identifier allocated for the specific UE as defined below. |
| >mmec | String | 1 | MMEC as defined in ETSI TS 136 413 [i.3]. |
| >mtmsi | String | 1 | M-TMSI as defined in ETSI TS 136 413 [i.3]. |

In an embodiment, a wireless terminal may request wireless information to the MEC application. IEEE 802.11 provides mechanisms for radio measurement gathering that may be used by any STA belonging to the wireless network. These mechanisms, although powerful, may be limited in scope, since the measurements that a STA may obtain or perform are limited to its own wireless network. This means that the STA may not be able to obtain information from other STAs or APs that do not form part of its own wireless domain.

Obtaining more complete radio information of the surrounding networks may enable multiple optimizations, yielding performance gains for end-user terminals. In an embodiment, the above defined IEEE 802.11 RNIS may provide more complete radio information to STAs.

FIG. 9 is a network diagram 900 which illustrates three different networks, 902-906, which provide information to and receive information from an ME service. Network 1 902 is comprised of two isolated APs 908, 910, each associated with two STAs 912-918. Isolated APs 908-910 may communicate with MEC platform 966 via interfaces 974, 976. Network 2 904 includes a WiFi controller 920 dedicated to controlling two controlled APs 922, 924, each associated with two STAs 926-932. Like Network 2 904, Network 3 906 also includes a WiFi controller 934 dedicated to controlling two controlled APs 936, 938, each associated with two STAs 940-946. The WiFi controller 920 of Network 2 and WiFi controller 934 of Network 3 906 may communicate information to and from the MEC platform 966 and ME service 950 according to HTTP or using a publish/subscribe paradigm. Other methods may also be used. The WiFi controller 934 of Network 3 906 may, in an embodiment, receive an information gathering measurement request from the ME platform and may provide a response to the ME service 950 of the MEC platform 966. Information gathering requests and responses may be made over interfaces 960-964. The ME service 950 may interface with an MEC APP 954 via an 802.11 RNIS interface or usage technology 972. The MEC APP 954 may provide radio metrics to STAs, for example directly to 956 STA 918. For example, STAs 912-918 of Network 1 902 may receive radio metrics without being under the direction of a WiFi controller. An ME service 950 may be in communication with an orchestrator 952. Orchestrator 952 and MEC platform 966 may be configured on different servers 980, 982 or may reside on a same server.

Each one of the STAs of each network may be configured to receive 970 network information regarding all of the networks. In this way, the MEC platform is used to provide MEC services to multiple wireless networks. These networks may belong to a same service provider or different providers. Networks may operate on different channels and even different radio access technologies. The MEC platform may contain a MEC application (Mapp) that uses the IEEE 802.11 RNIS to obtain information on the wireless usage of each of the wireless networks connected to it. This information is obtained requesting measurements to the APs, wireless controllers or directly to the different terminals. MEC platform may be controlled by an orchestrator.

One of the terminals located in one of the wireless networks served by the MEC platform may use the Mapp to obtain a view of current wireless status. In one example, this information may be important is when two access points are operating or working on an adjacent non-orthogonal channel. By measuring the performance obtained, and having an understanding of the deployment of the rest of the wireless APs, a STA may choose a better (or best) network to connect to.

In an embodiment, a virtual terminal may emulate a physical terminal wireless condition. There is currently a trend towards the virtualization of a user terminal in order to have a clone of it in the cloud, allowing operations to be performed without the need of terminating the communication with a particular user. This may allow or provide for new functionalities, but may also require an understanding of the wireless performance achievable by the user.

Figure 10:
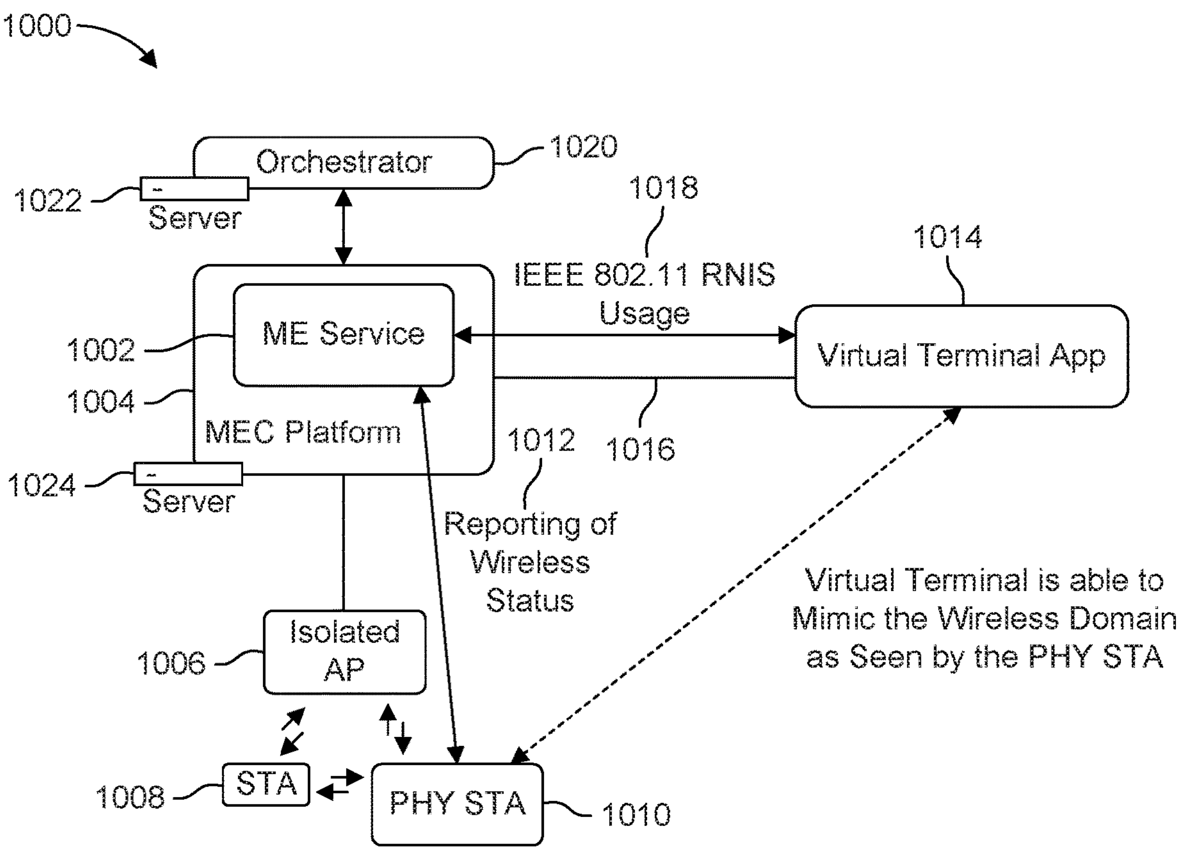
FIG. 10 is an illustration of example virtual terminal operation.

FIG. 10 illustrates an example network diagram 1000 which illustrates an example virtual terminal operation. It may be assumed that an artificial intelligence algorithm is performing some data acquisitioning or learning out of or from the user interactions or applications installed in the end-user terminal. As this may require a lot of computational power, the application instantiates a virtual version of the terminal in the MEC platform. In order to understand the way the user is interacting with the application, the virtual terminal may need to mimic the wireless domain and performance as seen by the end-user terminal. In order to do that, the virtual terminal application may use the IEEE 802.11 RNIS to get different metrics that may be able to be fed into the virtual terminal to get the same behavior, at least in an average case, to the real station, i.e. PHY STA 1010.

As shown in FIG. 10, an ME service 1002 may run on an MEC platform 1004. The MEC platform may communicate with an isolated AP 1006 which is associated with two STAs 1008, 1010. STA 1010 is a physical STA and may report wireless status to ME service 1002. A virtual terminal app 1014 may be instantiated to mimic the wireless domain as seen by the PHY STA 1010. In this way, the virtual terminal app may perform functions which may be offloaded by the PHY STA 1010. The PHY STA 1010 may communicate with the virtual terminal app 1014 which is performing functions on behalf of the PHY STA 1010. The communication may occur via IEEE 802.11 RNIS usage 1018. The virtual terminal app 1014 may communicate with the MEC platform 1004 and may communicate with the ME service. An orchestrator 1020 may be configured to run on a server 1022. MEC platform may run on a same or different server 1024.

Figure 11:
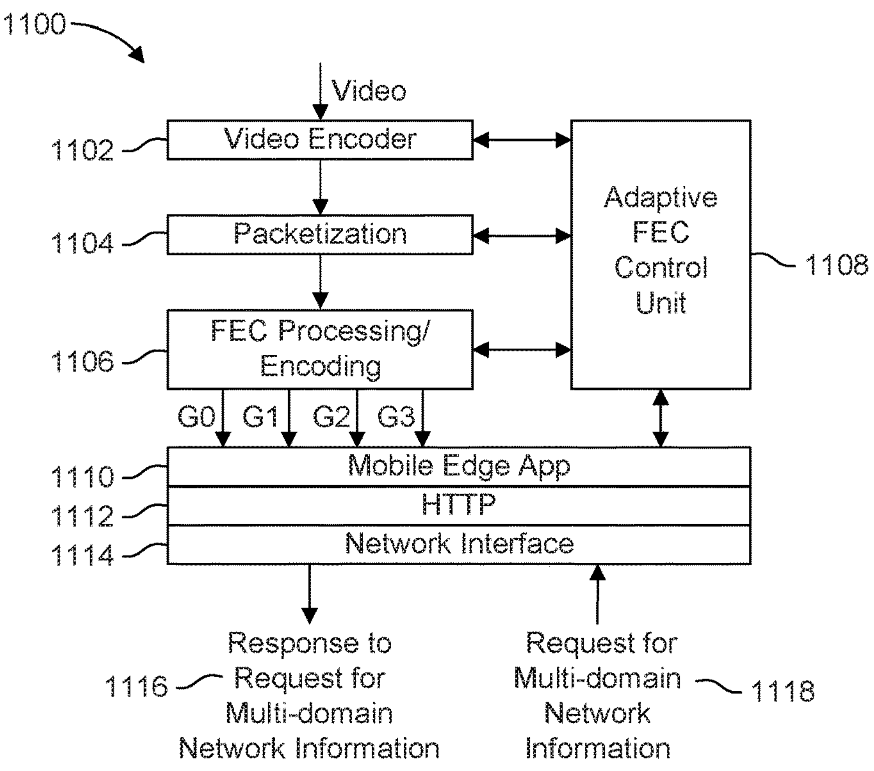
FIG. 11 is a block diagram illustrating a video server which employs adaptive forward error correction (FEC)

FIG. 11 is a block diagram illustrating a video server 1100 which employs adaptive forward error correction (FEC). The video server 1100 includes the video/source encoder 1102, a packetization unit 1104, an FEC processing/encoding unit 1106, an adaptive FEC control unit 1108. The video server 1100 may be, may include or may employ an ME app 1110, which communicates via HTTP 1112 over a network interface 1114. The ME app 1110 may receive a request for multi-domain network information 1118 via HTTP 1112 and provide a response 1116. The HTTP protocol 1112 may be used for communication with an MEP or RNIS for exchanging measurement requests/responses. Network information may be provided to the adaptive FEC control unit 1108. The FEC control unit 1108 may determine appropriate video coding parameters and FEC code overhead. The adaptive FEC control unit 1108 may instruct the video/source encoder 1102, the packetization unit 1104 and the FEC processing/encoding unit 1106 to perform the video encoding, packetization and FEC encoding. The adaptive FEC control unit 1108 also communicates with and is in control of a UDP/IP communication unit employed in accordance with or under HTTP 1112 in order to transmit video source packets and parity packets.

Figure 12:
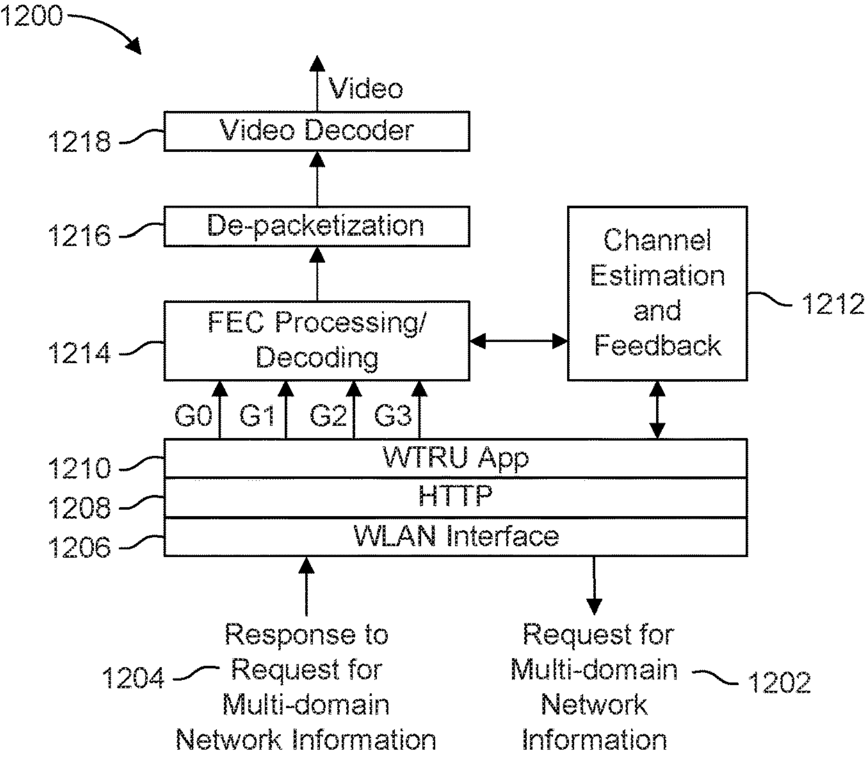
FIG. 12 is a block diagram illustrating receiver components of a WTRU running an ME app.

FIG. 12 is a block diagram 1200 illustrating receiver components of a WTRU running a WTRU app 1210. The WTRU of FIG. 12 may transmit one or more requests for multi-domain network information 1202 and receive one or more responses 1204 via a WLAN interface 1206. Messages may be sent using an HTTP 1208 protocol. A de-packetization unit 1216, a FEC processing/decoding unit 1214, a channel estimation and feedback unit 1212 may be employed by the WTRU. The channel estimation and feedback unit 1212 may receive, for example, a raw packet loss rate or any one of the measurement parameters disclosed and may provide relative information to the FEC processing/decoding unit 1214 accordingly. The video server components can be implemented on a single physical WTRU or on multiple WTRUs of a single domain or of multiple domains.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method, performed by a mobile edge computing (MEC) application (APP) (MEC APP), comprising:

transmitting, via a MEC Radio Network Information Service (RNIS) interface, to a wireless local area network (WLAN) information service, a first message indicating a request for a WLAN-specific configuration of a WLAN information service measurement, the configuration defining WLAN measurement parameters including at least a channel number to scan;

in response to the first message, receiving, from the WLAN information service, an OK message that includes the WLAN-specific measurement configuration corresponding to the requested configuration of the WLAN information service measurement;

transmitting, to the WLAN information service, a request for an access point (AP) information (APinfo); and in response to the request for the APinfo, receiving, from the WLAN information service, APinfo related to the configuration of the WLAN information service measurement.

2. The method of claim 1, wherein the APinfo comprises channel load information corresponding to one or more APs.

3. The method of claim 1, further comprising:

receiving, from the WLAN information service, information corresponding to other STAs.

4. The method of claim 1, further comprising:

receiving, from the WLAN information service, mobility information concerning end users associated with an IEEE 802.11 network.

5. The method of claim 1, further comprising:

receiving, from the WLAN information service, information on available access points for handover of a station (STA).

6. A device, comprising a processor, a transmitter, a receiver, a storage unit, configured with a mobile edge computing (MEC) application (APP) (MEC APP), and configured to:

transmit, via a MEC Radio Network Information Service (RNIS) interface, to a wireless local area network (WLAN) information service, a first message indicating a request for a WLAN-specific configuration of a WLAN information service measurement, the configuration defining WLAN measurement parameters including at least a channel number to scan;

receive, from the WLAN information service, in response to the first message, an OK message that includes the WLAN-specific measurement configuration corresponding to the requested configuration of the WLAN information service measurement;

transmit, to the WLAN information service, a request for an access point (AP) information (APinfo); and receive, from the WLAN information service, APinfo related to the configuration of the WLAN information service measurement, in response to the request for APinfo.

7. The device of claim 6, wherein the APinfo comprises a time stamp.

8. The device of claim 6, wherein the APinfo comprises an information element indicating a channel load.

9. The device of claim 6, wherein the first message is transmitted in a hypertext transfer protocol (HTTP) message.

* * * * *